United States Patent
Delpuch et al.

(10) Patent No.: US 7,055,169 B2
(45) Date of Patent: May 30, 2006

(54) SUPPORTING COMMON INTERACTIVE TELEVISION FUNCTIONALITY THROUGH PRESENTATION ENGINE SYNTAX

(75) Inventors: Alain Delpuch, Les Essarts le Roi (FR); James Whitledge, Naperville, IL (US); Jean-Rene Menand, Los Altos, CA (US); Emmanuel Barbier, Paris (FR); Kevin Hausman, Naperville, IL (US); Debra Hensgen, Redwood City, CA (US); Dongmin Su, Santa Clara, CA (US)

(73) Assignee: OpenTV, Inc., San Francisco, CA (US)

( * ) Notice: Subject to any disclaimer, the term of this patent is extended or adjusted under 35 U.S.C. 154(b) by 160 days.

(21) Appl. No.: 10/419,621

(22) Filed: Apr. 21, 2003
(Under 37 CFR 1.47)

(65) Prior Publication Data

US 2004/0139480 A1      Jul. 15, 2004

Related U.S. Application Data

(60) Provisional application No. 60/373,883, filed on Apr. 19, 2002.

(51) Int. Cl.
*H04N 7/173* (2006.01)
*H04N 7/16* (2006.01)

(52) U.S. Cl. .................. 725/100; 725/91; 725/138; 725/139

(58) Field of Classification Search ............. 725/91, 725/100, 109, 112, 135, 139; 709/217, 223, 709/225, 226, 231; 710/48, 266
See application file for complete search history.

(56) References Cited

U.S. PATENT DOCUMENTS

| 5,790,198 A | 8/1998 | Roop et al. |
| 6,184,878 B1 | 2/2001 | Alonso et al. |

(Continued)

FOREIGN PATENT DOCUMENTS

EP    0 839 599 A2    4/1998

(Continued)

OTHER PUBLICATIONS

"CSS3 Module: The Box Model"; W3C Working Draft, Jul. 26, 2001; This version: http://www.w3.org/TR/2001/WD-css3-box-20010726; Latest version: http://www.w3.org/TR/css3-box; Editor: Bert Bos; Copyright © 2001 W3C® (MIT, INRIA, Keio); pp. 1-104.

*Primary Examiner*—Kieu-Oanh Bui
(74) *Attorney, Agent, or Firm*—Meyertons Hood Kivlin Kowert & Goetzel, P.C.; Rory D. Rankin

(57) ABSTRACT

A method and mechanism for enabling the creation and/or control of interactive television content using declarative-like directives such as HTML, scripting languages, or other languages. A a centrally located proxy server is configured to receive, transcode and convey transcoded web based content to client devices. Upon detecting directives which indicate particular resources required for a presentation are prerequisites, the proxy server conveys signals to a client device that these particular resources are prerequisites. In response to receiving the conveyed signals, the client device may take actions to prefetch these resources. The client device is further configured to prohibit initiation of the presentation until the prerequisite resources are acquired.

23 Claims, 5 Drawing Sheets

U.S. PATENT DOCUMENTS

| | | |
|---|---|---|
| 6,188,401 B1 | 2/2001 | Peyer |
| 6,345,307 B1 | 2/2002 | Booth |
| 6,415,303 B1 | 7/2002 | Meier et al. |
| 6,539,359 B1 | 3/2003 | Ladd et al. |
| 2002/0010798 A1* | 1/2002 | Ben-Shaul et al. ......... 709/247 |
| 2002/0088011 A1* | 7/2002 | Lamkin et al. ............. 725/142 |
| 2002/0194219 A1* | 12/2002 | Bradley et al. ............. 707/506 |

FOREIGN PATENT DOCUMENTS

| | | |
|---|---|---|
| GB | 2 332 803 | 6/1999 |
| WO | WO 02/17639 A2 | 2/2002 |

* cited by examiner

SUPPORTING COMMON INTERACTIVE TELEVISION FUNCTIONALITY THROUGH PRESENTATION ENGINE SYNTAX

Priority of provisional application No. 60/373,883, filed on Apr. 19, 2002 is claimed under 35 U.S.C. §§ 119(a)–(e)

BACKGROUND OF THE INVENTION

1. Field of the Invention

The invention relates generally to interactive television systems and more particularly to a system and method for creating and controlling interactive television content.

2. Description of Related Art

Interactive television systems provide a means to deliver interactive content as well as ordinary television audio and video to a large number of subscribers. Programs broadcast by these systems may incorporate television audio and video, still images, text, interactive graphics and applications, and many other components. They may also provide a number of services, such as commerce via the television, electronic program guides (EPGs), video-on-demand, and other interactive applications to viewers. The interactive content of the interactive television signal may therefore include application code, data associated with the audio and video, control signals, raw data and many other types of information. This information can be combined into a single signal or several signals for transmission to a receiver connected to the viewer's television or the provider can include only a subset of the information.

The interactive functionality of the television is generally controlled by an integrated receiver/decoder (IRD) or similar mechanism, frequently incorporated into a set-top box, connected to the television. The IRD receives the signal provided by a broadcast service provider or system operator and separates the interactive portion from the audio-video portion. The IRD uses the interactive information to, for example, execute an application while the audio-video information is transmitted to the television. The IRD may combine the audio-video information with interactive graphics or audio generated by the interactive application prior to transmitting the information to the television.

Interactive content such as application code or information relating to television programs may be broadcast in a cyclical or repeating format. The pieces of information which are broadcast in this manner form what may be referred to as a "carousel." A carousel may include multiple modules of data, including a directory module which indicates the particular modules which correspond to a given application. Frequently, a single carousel is transported as a contiguous data stream. However, it is also possible to multiplex two or more carousels in a single data stream. As an alternative to using a carousel format, some systems may utilize a return path to request and/or receive interactive content.

Broadcast systems may transmit information in a carousel format in order to allow receivers in the system to selectively obtain particular pieces of information in the carousel without requiring a return path from the receivers to the server. If a particular receiver needs a particular piece of information, it can simply wait until the next time that piece of information is broadcast, and then extract the information from the broadcast data stream. By employing carousels to broadcast information, the system may eliminate the need to connect each of the receivers with a server and further eliminate the need for the server to process individual requests for information.

The pieces of information, or data objects, in a carousel may be intended to be combined in a single object data stream to form a program. This program may also contain streaming data such as audio or video. For example, an interactive television game show may combine television audio and video with interactive content such as application code which allows users to answer questions. Another example would be a news program which combines audio and video with application code that inserts current stock prices in a banner at the bottom of the screen. Typically, each program is associated with a corresponding channel and, when a channel containing a particular program is selected by the interactive television receiver, the data which is being broadcast on that channel is downloaded and the program is started.

As television receivers become more sophisticated, and include the ability to access a wider range of data and resources, efforts have been made to develop mechanisms to handle these additional resources. For example, the DVB MHP 1.1 specification and DAVIC 1.4.1 Part 9 specification define a URL scheme to access broadcast services. Since DAVIC broadcast networks carry Service Information (SI) that contains globally unique parameters for locating the services in a broadcast network, their URL scheme is able to address services in a physical network independent manner.

Unfortunately, such schemes may not work on ATSC networks or other networks that define different or even proprietary signaling formats. Therefore, a new more flexible scheme is desired.

SUMMARY OF THE INVENTION

A method and mechanism are described which enable content authors to use directives, such as HTML, scripting languages, or other languages, with television extensions to create and/or control interactive television content. The method and mechanism may be utilized with digitally recorded programs as well as with live broadcasts.

In one embodiment, a device in an interactive television system is configured to receive one or more directives provided by a content author which describe or otherwise indicate an audio and/or video presentation. Included among these directives are one or more directives which indicate that a particular subset of resources required for the presentation are deemed prerequisites. In response to detecting these directives, the providing of the presentation is withheld until the prerequisite resources are obtained.

In one embodiment, the directives are received by a centrally located proxy server which may be configured to receive, transcode and convey transcoded web based content to client devices. Upon detecting directives which indicate prerequisite resources for a presentation, the proxy server separately conveys to the client devices signals, or some other indication, that these resources are prerequisites. In response, the client device receiving the conveyed signals may take actions to prefetch these resources.

DETAILED DESCRIPTION

0. System Overview

Figure 1:
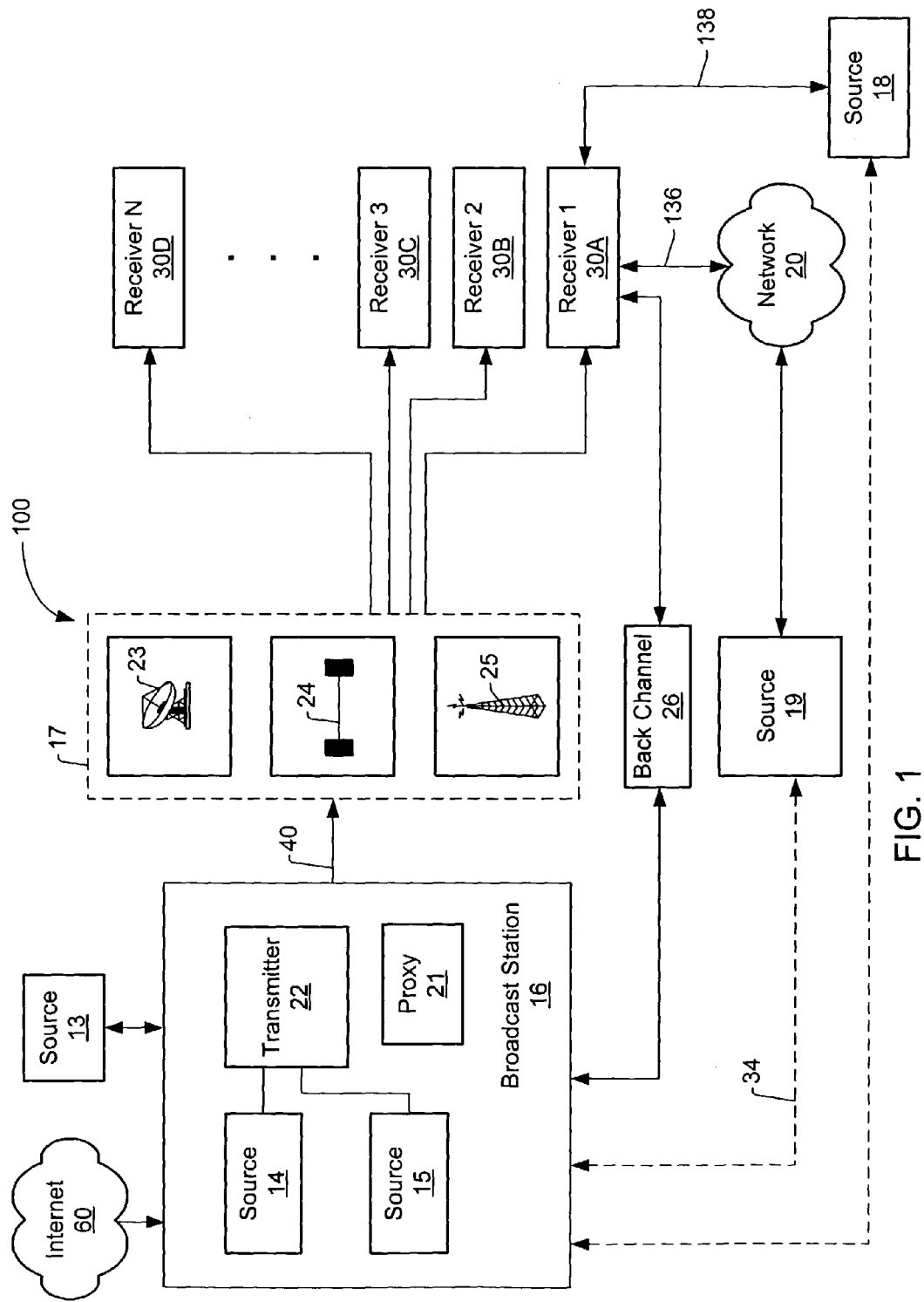
FIG. 1 is a diagram of one embodiment of a broadcast television system.

Referring to FIG. 1, one embodiment of a television system 100 is shown. In the embodiment shown, receiving devices 30 are coupled to several sources of programming and/or interactive content. Each of receiving devices 30 may comprise any suitable device, such as a set-top box (STB), a television (TV), a video cassette recorder (VCR), a digital video recorder (DVR), a personal digital assistant (PDA), a personal computer (PC), a video game console, or a mobile/cell phone.

Included in the embodiment of FIG. 1 is a broadcast station 16 coupled to receiver(s) 30 via a transmission medium 17 and back channel 26. In addition, receiver(s) 30 are coupled to a source 18 and source 19 via a network 20. Further, broadcast station 16 is coupled to a remote source 13, and Internet 60. In the embodiment shown, broadcast station 16 includes sources 14 and 15 and transmitter 22. Transmission medium 17 may comprise a satellite based system 23, a cable based system 24, a terrestrial or multiple multi-point distribution service (MMDS) based system 25, a combination of these systems, or some other suitable system of transmission.

In the embodiment of FIG. 1, broadcast station 16 may include a variety of sources of content 14, 15, and 60 to be utilized and conveyed by transmitter 22. Content sources 14 and 15 may include databases, application servers, other audio/video sources, or other data sources. In one embodiment, content may be created at a source 14 which may include an authoring station configured to create such content. An authoring station may include a computer workstation configured with software which aids in the development of interactive content. An authoring station may be part of broadcast station 16 in which case the conveyance of the created content may be through a local computing network, or similar configuration. Alternatively, an authoring station may be remotely located 13 from broadcast station 16. In an embodiment where authoring station is not directly coupled to broadcast station 16, the content created by a source 13 may be conveyed to broadcast station 16 via Internet, broadcast, cable, etc. In some cases, content created by at a remote location 13 may first be transferred to a storage medium, such as a CD-RW, DVD, or flash memory device, and transported to broadcast station 16 via more conventional means where it may be stored in a database or other storage device.

Subsequent to its creation, content from sources 13, 14, 15 and 60 may be delivered to receiver(s) 30 through a broadcast transmission network. This network consists essentially of broadcast station 16 which assembles the content from sources 13, 14, 15 and 60 and processes the content as appropriate (e.g., digitizes, compresses, packetizes), and a transmission network 17 which receives the content 40 from broadcast station 16 and conveys it 42 to receiving device(s) 30. In one embodiment, broadcast station 16 includes software and/or hardware which is configured to process the content conveyed by sources 13, 14, 15 and 60 as described above. A second delivery mechanism may include a direct point-to-point connection 138 between receiver(s) 30 and source 18 which may be some type of server. This connection 138 may be made via an ordinary telephone line, cable, wireless, or otherwise. A third delivery mechanism may also be a point-to-point connection 136, but transmission of the content from a source 19 to receiver(s) 30 is made via one or more shared networks (e.g., over the Internet).

FIG. 1 also illustrates broadcast station 16 may be optionally coupled to source 18 and/or source 19. Such a coupling may enable broadcast station 16 to work cooperatively with source 18 or source 19 in conveying content to receiver(s) 30. Also illustrated in FIG. 1 is a back channel (or return path) 26 by which receiver(s) 30 may convey to and/or receive data from broadcast station 16. Back channel 26 may comprise a telephone line, cable, wireless, or other connection.

One delivery mechanism, the direct point-to-point connection to a source of content, may comprise communication via an ordinary telephone line. This type of connection is typically initiated by the receiver(s) 30 to convey information to, or retrieve information from, a data server. Another delivery mechanism, the point-to-point connection through one or more networks, may comprise a typical connection between nodes on the Internet. Because data may be routed through many different shared networks in this case, it may be read, stored and written many times as it is transmitted from source 19 to receiver(s) 30. The third delivery mechanism may include a satellite, cable or terrestrial broadcast network 17. Information may be transmitted from and to receiver(s) 30 both in real time or store and forward.

In one embodiment, broadcast station 16 further includes a proxy server 21 which is configured to transcode received content to a format compatible with one or more of client devices 30. For example, proxy 21 may receive web based content including directives written in HTML, JavaScript™ (JavaScript is a trademark of Sun Microsystems, Inc), CSS, or other languages, and transcode the received content to a format compatible with clients 30. In alternative embodiment, clients may be configured to directly process such directives. In such a case, proxy 21 may be configured to perform certain types of preprocessing of the content prior to conveyance to the clients.

Figure 2:
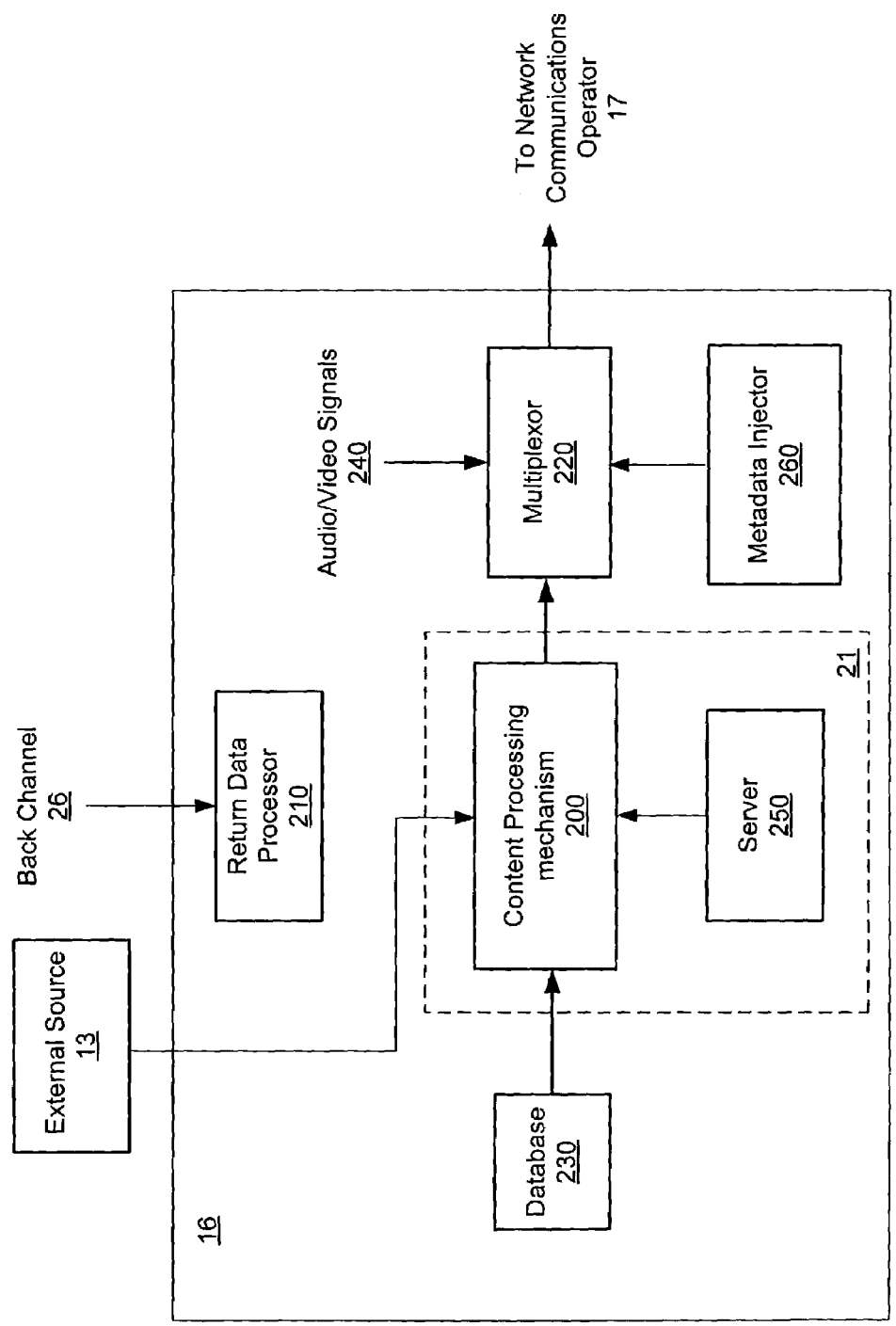
FIG. 2 is a diagram of one embodiment of a headend.

Turning now to FIG. 2, an overview of one embodiment of a broadcast station (head-end) 16 is shown. The broadcast station 16 of FIG. 2 includes an application server 250 and a database 230 which may contain previously created interactive content. Also shown in FIG. 2 is a source 13 of content (e.g., the Internet) which is external to broadcast station 16 and coupled to broadcast station 16. Database 230, server 250, Internet 60, and source 13 are coupled to a content processing mechanism 200 which is configured to process the content received and convey the processed content to a multiplexor 220. In the exemplary embodiment of FIG. 2, proxy server 21 includes server 250 and processing mechanism 200.

In one embodiment, content processing mechanism 200 comprises a computer coupled to receive and convey content from source 13, database 230, or server 250. Processing mechanism 200 is configured to convey the processed content to multiplexor 220. Multiplexor 220 is also coupled to receive audio/video signals 240. Multiplexor 220 multiplexes the received signals and conveys the multiplexed signal to network communications operator 17 where it is subsequently conveyed to a receiving device. As noted above, proxy 21 may be configured to process received content prior to conveying the content to client devices. For example, proxy 21 may be configured to receive requests from clients for web based content, obtain the requested content, and transcode the received content to an alternate format prior to conveyance to the requesting client. Finally, in addition to the above, broadcast station 16 includes a return data processor 210 coupled to back channel 26. In one embodiment, return data processor 210 may comprise a modem which receives data for further processing within broadcast station 16.

While the above description describes a source of interactive content as being at a broadcast station 16, in an alternative embodiment database 230 and content processing mechanism 200 may reside at the location of a network communications operator 17. An example of such an alternative embodiment may be a cable station which inserts interactive content into a broadcast signal prior to transmission. Numerous such alternatives are possible and are contemplated.

Figure 3:
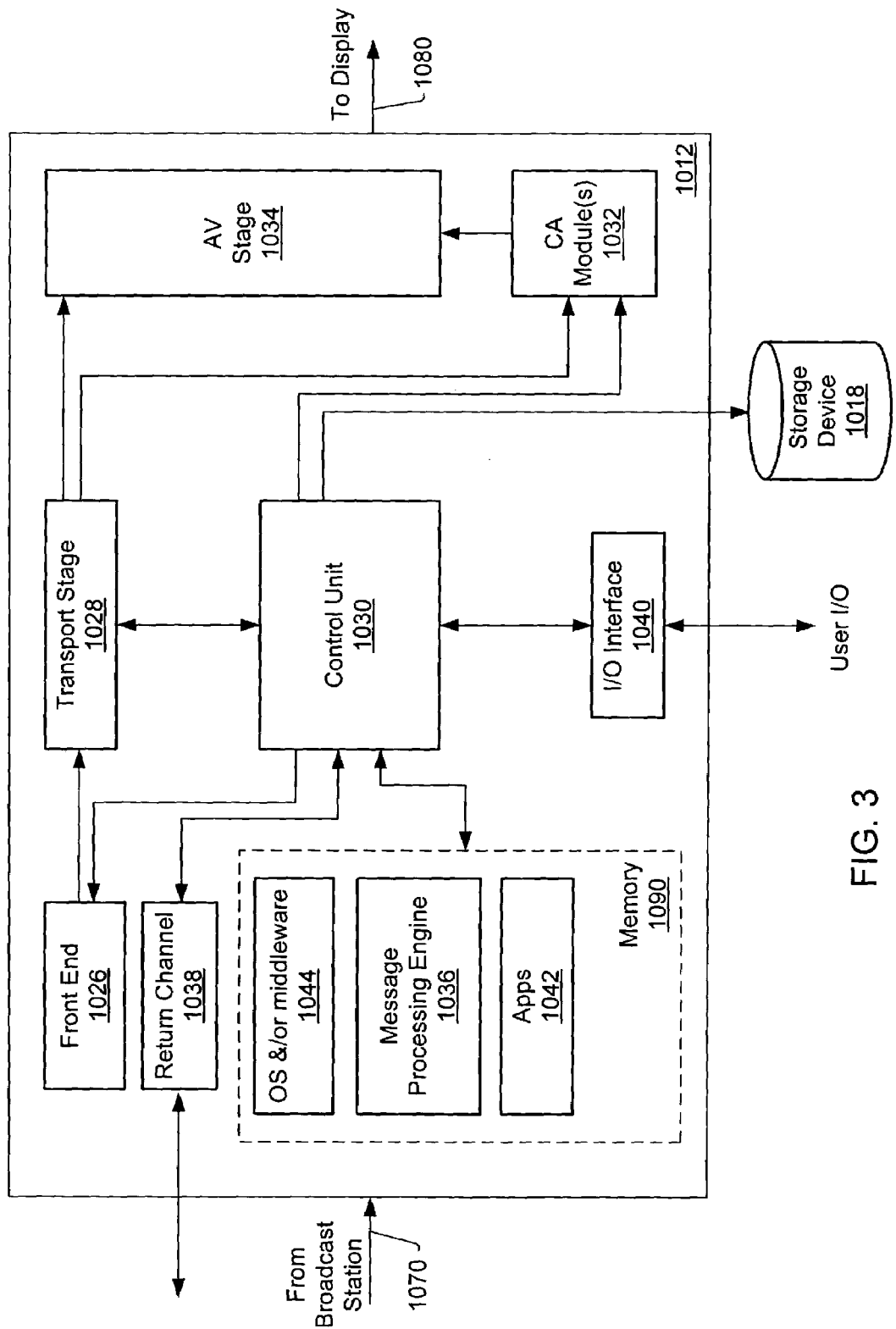
FIG. 3 is a block diagram of one embodiment of a client device.

Turning now to FIG. 3, one embodiment of a receiving/initiating device 1012, hereinafter referred to as a "client" is shown. While FIG. 3 illustrates the client 1012 in the form of a set top box 1012, client 1012 may comprise other devices as well. Generally speaking, client 1012 is configured to receive a first signal 1070, such as a broadcast signal, and convey a second signal 1080, such as to a display or recording device. While in the embodiment shown, client 1012 is shown coupled to an external mass storage device 1018, such storage may be internal to the client 1012 itself. Client 1012 includes a control unit 1030, front end 1026, return channel 1038, transport stage 1028, and AV stage 1034. Also represented in FIG. 3 is a memory 1080 which includes OS and/or middleware 1044, message processing engine 1036, and applications 1042. Also shown is an I/O interface 1040 and conditional access (CA) module(s) 1032. I/O interface 1040 may be configured to detect user interaction via a remote control, keyboard, or other device. Control unit 1030 may comprise a microprocessor, memory (e.g., RAM), and other components which are necessary to perform ordinary general purpose computing.

In one embodiment, applications 1042, OS/middleware 1044, CA module(s) 1032, and message processing engine 1036 comprise code which may be stored in a memory device of set-top box 1012. Additionally, CA module(s) 1032 may comprise system software configured to control access to particular programs or services which are accessible by set-top box 1012. While message processing engine 1036 is shown as program code which may be stored in memory 1090 and executed by control unit 1030, it is understood that other embodiments are possible and are contemplated. For example, message processing engine 1036 may comprise circuitry or a combination of hardware and software. For example, message processing engine 1036 may comprise a processing device executing program instructions. Further, message processing engine 1036 may be configured as an external device which may be coupled to a receiving unit. For example, such an external device may comprise an expansion module which is configured to add message processing functionality to a preexisting device.

Generally speaking, client 1012 is operable to receive and decompress signals which may include digital data. The decompressed signals may be converted into analog signals such as PAL, SECAM, or NTSC format signals for television display, or may be in digital format for use by a digital television display. As shown in FIG. 3, client 1012 includes front end circuitry 1026 operable to receive audio, video, and other data from a received signal 1070. The received signal 1070 is fed into the client 1012 at the front end 1026, which may comprise an analog to digital (A/D) converter and tuner/demodulators (not shown). Front end 1026 may select and pass a particular frequency, demodulate it, and convert analog signals to a digital format. While analog data may be converted to digital data, as noted above a received signal may comprise digital data which may require no such conversion. The digitized output may then be conveyed to a transport stage 1028 which further processes the data, conveying a portion of the data to an audio-visual (AV) stage 1034 for display and another portion to control processor 1030. In addition, CA module 1032 may receive data from transport stage 1028 and may conditionally convey a descrambled or other signal to AV stage 1034. Signaling and control information may also be included in the broadcast along with the audio-video data and may be manipulated by software within the client 1012.

Audio-video signals and program control signals received by the client 1012 may include television programs, metadata, and menu selections accessible by a viewer through a user interface, as well as applications that may be executed. A viewer may control the client 1012 in a variety of ways, including through an infrared remote control unit, a control panel on the client, or a device that is used to choose from a menu displayed on the television screen. Selections and entries made by the viewer may be intended for one or more of several applications that are executing on the client. As mentioned above, broadcast signals 1070 are received via front end 1026 and are filtered by transport stage 1028. Unicast or multicast signals may generally be received via return channel 1038. Applications 1042 which execute on the client 1012 may arrive there in a variety of ways. For example, applications may be received via a broadcast signal 1070, via the return channel resource interface 1038, or via storage device 1018. Applications received via storage device 1018 may have been shipped originally with the client 1012 or may have been downloaded previously from another source and stored on storage 1018.

In one embodiment, client 1012 may be configured as a digital set top box for use with a satellite receiver or satellite integrated decoder/receiver that is capable of decoding MPEG video, audio, and data. For example, client 1012 may be configured to receive digital video channels that support broadband communications using Quadrature Amplitude Modulation (QAM), Quadrature Phase Shift Keying (QPSK), Coded Orthogonal Frequency Division Multiplexing (COFDM), or 8-vestigial side band (VSB), and to control channels for two-way signaling and messaging. The digital channels may carry compressed and encoded multi-program MPEG (Motion Picture Expert Group) transport streams. Transport stage 1028 extracts the desired program from the transport stream and separates the audio, video, and data components, which are routed to devices that process the streams, such as one or more audio decoders, one or more video decoders, and optionally to RAM (or other form of memory) or a hard drive. It is to be understood that the client 1012 and storage device 1018 (as well as any data and signals from the broadcast service provider) may be configured to accommodate analog, digital, or both analog and digital data. For storage of received analog data, conversion to digital format may be performed.

Storage device 1018 is optionally coupled to the client 1012 and may be configured to store video, audio, executable code, metadata, and other data. Storage device 1018 may be internal to client 1012 or connected externally (e.g., through an IEEE 1394–1995 connection) with either a permanent connection or a removable connection. Further, storage device 1018 may comprise any suitable type of storage, such as a hard disk drive, a recordable DVD drive, magnetic tape, optical disk, magneto-optical disk, flash memory, or solid state memory. In addition, more than one storage device such as device 1018 may be attached to the client 1012. The client 1012 and/or storage device 1018 may further be incorporated into a television set. Executable data, such as program instructions, which is stored within storage device 1018 may be retrieved and executed. In one embodiment, retrieved data may be executed or otherwise utilized in synchronization with other applications or received signals, for example corresponding to a game show, commercial, or Internet based on-line game. Alternatively, retrieved data may be executed or utilized independently, such as for video-on-demand, banking, e-mail, a web browser, or an electronic program guide (EPG).

It is to be understood that the client 1012 and system 100 described herein are intended to be exemplary only. Broadcast network system 100 and client 1012 may be different than described herein without departing from the scope of the invention. Further, various components depicted in the client 1012 of FIG. 3 may be combined, such as the placement of the integration of storage device 1018 within client 1012. Numerous alternatives are possible and are contemplated.

1. Application Model and Life Cycle

Generally speaking, an interactive television application may start in either a maximized state or a minimized state, depending upon how it is authored. Signaling in the directory may indicate to the system whether the application is starting in the minimized state or the maximized state. From a system's perspective, the difference between the minimized state and the maximized state is that applications which are in the minimized state may not receive a notification when a viewer presses keys. Alternatively, when in a maximized state, applications may present a filter to the system that tells the system to notify them when keys designated in the filter are pressed. While not necessarily required, an application executing in a minimized state typically reduces its usage of resources. For example, it may present an icon on the screen rather than extended graphics.

In addition to the above, an application running in either a minimized state or a maximized state may be suspended. Upon suspension, an application is not generally notified, but rather no cpu time is allocated to the application. At the termination of the suspension, an application returns to the state it was in prior to suspension. In either case, the system may invoke a function in the application to notify that application that it had been suspended so that it may take any actions necessary to ensure internal consistency.

Applications may terminate normally or may be asked by the system to terminate, for example, if a new application appears in the broadcast stream. Because an application may be in a state where termination would be disruptive to the viewer, the application may deny a request to terminate immediately. For example, a viewer may be in the middle of an online transaction to purchase an advertised product. When an application does terminate, the system is notified so that it can determine, typically working together with the network-provided control task, which application to execute next.

Transitions between states may be responses to a variety of stimuli including broadcast signaling, viewer button presses, and decisions made by the system or the applications themselves. As noted above, the initial state of an application may be determined by broadcast signaling. A button press may be used to cause an application to move from the minimized state to the maximized state. The application itself may decide when to transition to the terminated state and when to transition to the minimized state. The system may suspend an application in order to execute another application. Further, broadcast signaling can cause the system to request that an application exit.

While the life cycle defined above may represent a default life cycle, modifications to the life cycle may be provided by calls in a network provider control task. For example, one need not even load an application until the viewer responds with an appropriate button selection in response to the presentation of an icon. Further, the above life cycle may generally correspond to a model in which only a single application is executable at a time. However, in order to support multiple applications concurrently, the application model and life cycle definition may be more complex. For example, priorities may be signaled so that the implementation may determine which applications may execute in the event that the hardware is not capable of supporting all of the signaled applications simultaneously.

Applications developed for use in interactive television systems may generally include programming code similar to that of programming languages such as C, C++, etc. However, with the proliferation of the World Wide Web (Web), and the desire to take advantage of Web and Web like resources in interactive television systems, the use of other languages such as HTML and the Javascript™ (JS) language may be useful. However, while the use of HTML applications may be desired, the life cycle of HTML applications in an interactive television environment may be complicated by several factors.

First, HTML/JS content may be more dynamic than persistent. For example, in a current interactive television environment, an application may be configured to only execute code or use data that is packaged within the carousel in the same directory as the first program module. Hence, for security reasons the directory contents may clearly define the application boundary and the permissions signaled within the directory may be applied to the entire contents of the directory. However, HTML/JS content may refer to other content (e.g., via a link) that is to be acquired from some location other than the carousel and the content that is referred to may replace the initial content. It is not clear that it is safe in this case to apply the same security permissions to such replacing content. Therefore, due to this dynamic nature, it is more difficult to define an "application boundary."

Second, even when a product does not support multiple concurrent applications and restricts the application to only that content carried within the same directory in the carousel, there may be life cycle issues that affect the way that a content author designs the HTML/JS content. For example, if it is determined that the broadcaster can signal that an application may quit, it may be useful to invoke a handler written by the content author to respond to such an event. Similarly, there may be other states which might best be handled by an application-specific handler. For example, if the viewer is in the middle of a transaction involving an application, that application may wish to delay its termination until the transaction completes. Therefore, an application may be notified by the system when a broadcaster signals a new application available in the broadcast. In one embodiment, the application may be notified via an event, such as the O_exit event identified below. An application that determines that it does not want to exit immediately may extend its life by calling a defined event function such preventDefault( ).

```
O_exit
    Bubbles      : yes     -- (see DOM event model)
    Cancelable   : yes
    context info : the reason for exiting.
```

2. Tuning and Stream Selection

In one embodiment, two different ways for broadcast signal tuning and stream selection are provided. The first uses a markup language, such as HTML, and assumes that the content author has sufficient a priori knowledge as described below. The second uses a scripting language such as Javascript, does not assume the same a priori knowledge, and is generic enough to be applicable to stream selection from a local hard drive or VOD. Both make use of a new URL defined here known as the "broadcast:" URL. First, the URL which is used in both methods is described.

URL which can be Used for Tuning and Stream Selection

In some broadcast environments, such as MPEG based environment, it may be possible to associate a globally (or at least network) unique identifier with a broadcast stream. Use of such a unique identifier within a URL scheme may allow the unique identification of resources within that stream. A syntax of a broadcast Url scheme is provided below. Generally speaking, this scheme may provide a general mechanism for identifying broadcast resources in a manner that is network independent and platform independent. This scheme may work with digitally recorded programs as well as with live broadcasts.

The following is a formal syntax, in BNF like grammar, for a "broadcast:" URL. In the following, note that rules are separated from definitions by an equal "=", "|" is used to designate alternatives, literals are quoted with " ", parentheses "(" and ")" are used to group elements, optional elements are enclosed in "[" and "]" brackets, and elements may be preceded with <n>* to designate n or more repetitions of the following element where n defaults to 0.

```
broadcast_url        = broadcast_scheme ":" [ broadcast_hier_part ]
broadcast_scheme     = "broadcast"
broadcast_hier_part  = broadcast_net_path | broadcast_abs_path
broadcast_net_path   = "//" service_address [ component_list ]
                       [ broadcast_abs_path ]
service_address      = channel_name | "current"
channel_name         = *( domainlabel "." ) toplabel
domainlabel          = alphanum | alphanum *( alphanum | "-" )
                       alphanum
toplabel             = alpha | alpha *( alphanum | "-" ) alphanum
alphanum             (may be as defined in RFC 2396)
alpha                (may be as defined in RFC 2396)
component_list       = ";" component *( "," component )
component            = stream_selector
stream_selector      = stream_type "=" stream_id
stream_type          = "video" | "audio" | "data" | "subtitle" |
                       "teletext"
stream_id            = 1*alphanum | "default" | "current" | "none"
broadcast_abs_path   = "/" path_segments
path_segments        (may be as defined in RFC 2396)
```

Given the above definition, one example of a summary of usage may be represented:

broadcast: {//<service_address>{; <component_list>}}

Where service_address is defined as follows:

```
service_address ::= channel_name|current
where:
channel_name specifies a DNS-style name that uniquely identifies the
channel.
current     specifies the service currently selected.
```

The component_list is a comma-separated list identifying specific components in the stream and may be defined as follows:

```
component_list  ::=  component *("," component)
component       ::=  stream_type "=" (track_tag|"default")|
stream_type     ::=  "video"|"audio"|...
```

A track_tag may be defined as an ASCII string of arbitrary length, typically between 1 and 4 bytes. A track_tag of "0" is equivalent to the default component of the specified stream type. For example, the URL "broadcast://tfl.fr; video=0, audio=eng" identifies the default video stream and the English audio stream on the channel named "tfl.fr".

A/V MIME Types Associated with the Broadcast: Url

While the following discussion primarily describes the semantics associated with video and audio stream types, other stream types are permitted within the URL and are discussed in the section entitled "Obtaining Applications and Data" below. In either case, in one embodiment, the following events may be dispatched during a service selection.

| Stream Selection Events | |
|---|---|
| Click | The selection occurred as a result of a click event. Default action is to request the specified service. Note that this event is generally a user-input event. |
| Load | If the request succeeds, a load event will be dispatched. Normally such an event is dispatched after the URL is finished loading, but indefinite video and audio streams would never finish loading. Hence, it is appropriate to dispense this event once processing of the requested audio and video streams has been successfully initiated through all of the hardware involved in the processing pipe. |
| Error | If the request is denied or otherwise invalid an error event is dispatched. |
| Abort | If the user aborts the request before the load event is dispatched, an abort event is dispatched. |
| Unload | If the request replaces an existing target an unload event is dispatched. |

When no component list is specified, the MIME type corresponding to the broadcast: URL may be application/mpeg.service and this type may correspond to a service as defined an MPEG standard. Hence, such a MIME type would contain not only video, audio, and subtitles, but also the data that is multiplexed on the same service with them, e.g., html and/or other applications.

When a video component is specified, the MIME type corresponding to the broadcast: URL is video/mpeg. Similarly, when an audio component is specified, the MIME type corresponding to the broadcast: URL is audio/mpeg.

As shown in the examples below, it is possible to refer to multiple elementary streams in a single URL. If the streams referred to include only a single video stream and a single audio stream which is synchronized with that video stream, then the resulting streams will be considered to be of type video/mpeg; otherwise, the type of the multiple streams will be type application/mpeg.service.

EXAMPLES

This section explains the meaning of several example URLs, which, in some cases, if used as in the complete example shown in the next section, could result in tuning and/or stream selection.

Broadcast:
Identifies the currently tuned service_address and component_list for the primary pipe (see JS Tuning and Stream Selection below). This usage is similar to "tv:" in the DASE specification and "dvb://current.av" in the MHP specification. So, for example, this may be used within an HTML element to re-size and re-locate the currently playing video.

broadcast://cnn.com
Identifies the CNN TV channel and all of its component streams. This form of the URL can be used to request that the TV tuner switch channels. This URL in a service selection context causes the automatic selection of the default streams. That is, when used in a service selection context, the user-agent will (if the application is appropriately authorized) tune to the new channel and automatically select the default video stream, select the default audio stream (based on the preferred language), select the default sub-titles and teletext if identified in the user's current preferences, and select the default data carousel.

broadcast://cnn.com;audio=eng
Identifies the CNN TV channel and explicitly selects only the English audio stream. Documents use this form of the URL to explicitly reference a specific elementary stream.

broadcast://current;audio=eng,video=current
Selects the English audio stream on the current service. This URL allows the author to switch the current audio stream without explicitly knowing the current service address, and without changing the currently selected video stream.

2.1 HTML Tuning and Stream Selection
When the content author has knowledge of the DNS name that corresponds to a given channel, they may use HTML to cause tuning to that channel. For example, the following HTML allows the HTML document to present a link, "my_link", which requests the tuner to select a new service.
<A ID="my_link" HREF="broadcast://cnn.com">Click Me</A>

If the request is authorized and resolves to a valid channel_name, then the HTML document will be unloaded and replaced with a TV media handler playing the default video and audio streams associated with the cnn.com service.

In one embodiment, HTML applications may permit the use of URLs that reference MPEG video or audio streams or MPEG-2 services as illustrated in the following HTML elements and CSS attributes. If use of the URLs result in component selection from the currently tuned service, only the Load, Error, or Abort events could occur.

| | HTML element | | |
|---|---|---|---|
| Attribute | video/mpeg | audio/mpeg | application/mpeg.service |
| background-image | yes | | yes |
| background-video | yes | | yes |
| a.href | yes | yes | yes |
| img.src | yes | yes | yes |
| input.src | yes | yes | yes |
| object.data | yes | yes | yes |

In Addition, URLs may cause service selection when referenced via the location object in a scripting document object model as described below or when used as a parameter in a "goto" dialog.

2.2 JavaScript Tuning and Stream Selection
A second way to enable signal tuning and stream selection utilizes a scripting language such as JavaScript to allow the content developer to explicitly control virtual pipes that exist between sources of audio and video (e.g., tuner, local hard drive) and their destinations (e.g., screen, local hard drive). This section describes how a JavaScript programmer can exert fine-grained control over not only which streams are chosen for display, but also which streams may be recorded onto a hard drive and the speed and direction with which recorded streams are displayed.

An abstraction, known as a pipe, may be used used to embody the association between the source of a stream (e.g., a tuner or a file containing a recording on a hard drive) and the ultimate destination (e.g., the display or a file on the hard drive), including, for example, any resources that are required between the source and destination (e.g., Conditional Access hardware, I/O buffers).

When receiver software boots up, a set (or array) of pipes may be defined. In one embodiment, this array of pipes represents all of the possible connections between stream sources and destinations that may be represented on a particular hardware platform. Other embodiments may represent fewer than all possible connections. Because these are abstractions, it is possible to have a defined pipe without having all of the hardware which is required by the pipe currently allocated to that particular pipe. A defined pipe where less than all of the hardware has been allocated to it is said to be in an "unrealized" state. A pipe is "realized" when all required hardware has been allocated to that pipe.

The programmer may use the defined pipes array to:
  select a pipe
  set the source of a pipe
  set the destination of a pipe if it is a file
  control the speed of a pipe, if the source is thus controllable, and also be able to set the location when such is possible
  select the components of a stream that will be sent to the destination
  add or remove event listeners
  and request that a new pipe be started for recording purposes.

In addition, the programmer may determine which pipe is being used for a given image by using the id which is associated with that image. For example, if there is an HTML snippet included that states
<img id="foo"src="tv:cnn.com"> then, the JS programmer may refer to foo.pipe and invoke any of the methods which are described below and may read/write the values in the attributes as permitted by the definition below.

The Pipes Collection and the Tvpipe Object

Object Model Reference:
 [window].navigator.tv.pipes[i]
 [window].navigator.tv.pipes.primary The pipes array above is a collection of TvPipe objects as described below. The primary object is a reference to a pipe object that can be settable or gettable in javascript. The TvPipe object has the following properties, methods, and collections.

The TVPipe Object positioned and sized, and how the audio can be controlled. Transparency between the graphics plane and the video plane, palette-based color, and the MPEG I-Frame are discussed here as well.

In one embodiment, a receiver may be configured to support multiple graphics and video layers. In such an embodiment, there may be a bottommost layer that is used to display video and an interactive layer (OSD) on top of that which is used to display text and graphics. Rendering of video, both stills (e.g., I-frames) and in-motion video, may be supported by a hardware MPEG decoder.

In addition to the above, an extension may support a layer on top of the OSD layer called the subtitle layer. A further extension may be used to support a multi-plane graphics layer. In one embodiment, this layer may lie logically between the bottommost layer and the interactive layer. This

```
Properties:
    name          String that identifies this pipe in the pipes[] array. (Read-only)
    src           URL corresponding to the current channel (read/write)
                       -- may correspond to either a file: or broadcast: url
    realized      "true" | "false" (read-only)
    status        "connected" | "connecting" | "disconnected" | "disconnecting"
                       -- (read-only)
    destination   only if pipe is currently being used for recording (read/write)
                       -- url corresponding to file:
    type          "record" | "display" (read-only)
    position      unsigned int (read-write)
                       -- # of ms into the event
    speed         int      (read-write)
                       -- 100 is normal speed
                       -- 0 is still
                       -- 500 is 5 times normal speed
                       -- -100 is normal speed, backwards
                       -- -500 is 5 times normal speed, backwards
                       -- 50 is half speed, forwards, etc.
    event_info    name-value pairs about the current event (read-only)
Collections:
    Components[]  array of component objects (see TvComponent below)
                       indicating those which are currently selected
Methods:
    record(uri)   Starts the recording to the file named in the uri if sufficient
                  resources exist.
    addEventListener( )
    removeEventListener( )
    dispatchEvent( )
```

The TvComponent Object

A TvComponent object represents a data stream which may be carrying video, audio, interactive data, subtitles, or other content types.

Object Model Reference:
 [window].navigator.tv.pipes[i].components[i]

```
Properties:
    name      String that represents the name (i.e., the value of the
              track_tag) of the component (read-only)
    selected  "true" | "false" (read/write)
                  -- boolean indicating that this component has been
                  selected
    type      "audio"|"video"|"data"|"subtitles"|"teletext" ...
              (read-only)
```

3. Controlling the Display and Playing of Video, Graphics, and Audio in HTML/JS

This section describes how graphics may be positioned and sized on top of video, how the video itself can be multi-plane graphics layer may be used to display still pictures such as JPEG, MPEG, or other images. Included below is a discussion of support for images in the multi-plane graphics layer.

3.1 Color and Transparency

Various models exist for specifying how color information is represented. For example, a "color space" is a model for representing color in terms of intensity values. Examples of color spaces include RGB which is commonly used for computer displays, CMYK which is used for color printers, and YUV which is traditionally used for television.

The number of bits used to define a pixel's color may be referred to as its bit-depth. True color, sometimes referred to as 24-bit color, is the specification of the color of a pixel on a display screen using a 24-bit value. By using 24-bits to specify color, up to 16,777,216 colors are possible. Display systems vary in their ability to support color. For example, some color display systems offer a 32-bit color mode. In a 32-bit color display system, the extra byte, called the alpha channel, may be used for control and special effects information.

Because lower end set-top boxes may not have sufficient memory to support true color, palette-based models may be used. With a palette based model, the color of a pixel is represented by an index into a color palette. In such a model, content authors may define their own color palettes containing colors of their own choosing. The actual colors in a palette are typically represented as 48-bit numbers with the first three of those numbers representing the actual color and the fourth of the numbers representing the amount of transparency in the color.

In a system where there is sufficient memory to support true color, multiple applications can share the screen with little or no problem because the fixed color palette is large enough to accommodate the multiple different hues required by each application. However, in a system where the number of colors supportable is limited, if multiple applications sharing the screen declare their own color palette, the viewer experience can be disturbing.

Often devices where graphics overlay video (such as less expensive set-top boxes) have palettes with limited built-in transparency models. Two common models where transparency is limited include the following:

a. Only a single non-opaque element in the palette is supported. For example, that element could be completely transparent, or it could be pink that is 50% transparent, etc. In either case all other elements must be opaque.

b. A single element in the palette that can be an semi-transparent or completely transparent is supported. All other elements in the palette can be either completely opaque or have a particular, fixed amount of transparency. For example, a palette that can hold n colors could contain a single color that is 30% transparent, m (m>1) colors that are 50% transparent—in this case the remaining n−(m+1) colors must be either 50% transparent or completely opaque. In other words, there cannot be 3 non-opaque colors in a palette all having a different level of transparency.

In order to maximize the availability of the transparency values for the author's use, a system may be defined that allows an author to specify a region, including both its location and dimensions, which they want to contain overlay graphics. Were the author not able to specify this region, they would have to "waste" (the) one transparent color by painting the area outside of the graphics region with the (sometimes only) transparent color available in the palette. (This also reduces the amount of space required to store the On-screen display graphics.) Subsequently, the an application may be configured to dynamically change its region (even when that application is transcoded prior to broadcasting).

Fixed-Variable Palette

In one embodiment, a combination fixed-variable palette may be used where the variable components are specified by the application. The first m of n colors may be chosen to be fixed with the $0^{th}$ color being fully transparent. For example, in a 256 color palette where there are 8 bits available for color, the first 188 colors may be as specified in an existing or proposed standard, such as the DVB MHP color palette. The remaining 68 colors may be taken from colors specified by the color palette accompanying the image. In one embodiment, these 68 colors may be selected from the first 68 colors specified in the image palette. Therefore, an application content designer should ensure that the most important colors are placed first in the palette.

If it is necessary to support multiple applications, each of which brings its own color palette, then the system may choose to place into the palette a mixture of the first colors in each of the application/image specific palettes. Similarly, any time it is expected that multiple images will be sharing the screen, the author of those applications may get best results by using only the fixed colors in one of the images or the same palette for both of the images.

Transparency between the graphics and video plane may be important in interactive television, as the viewer often wants to be able to see the video that is running under the interactive text or images. In one embodiment, the Porter-Duff SRC composition rules may be used for composing graphics with each other. Generally, the underlying video is opaque, hence the video shows through the graphics when they are transparent. The Porter-Duff SRC rule is relatively easy to compute because the transparency of one object over the top of another chooses the alpha (transparency) value of the object on top as the transparency of the composed objects. While in some cases this result may appear somewhat un-natural looking, graphic artists are accustomed to planning their layout with this rule in mind.

Because it may be computationally complex to compute the resulting alpha value, set-top boxes may be permitted to approximate the SRC-Over rule using the SRC rule (unless the object on top is completely transparent, in which case, the pixel values for the transparent object should not be applied). In one embodiment, HTML applications may specify a particular default composition rule, such as SRC-Over. However, in those cases in which a set-top box does not have sufficient computational power to compute the SRC-Over composition, an approximation of the SRC-Over rule may be used (e.g., using the Porter-Duff SRC rule.)

3.1.1 The Clut Property

The palette format discussed below allows images whose colors are specified using an index into a palette to also specify per-pixel transparency values through the use of an alpha channel. However, for other images, backgrounds, etc., another method may be required for specifying the transparency. Therefore, new properties which allow the specification of these alpha values is described in the subsection below entitled "Alpha Properties."

An application author may specify that a particular palette (often referred to as a color lookup table or "clut" for short) may be useful in rendering objects in the body of an HTML page. This palette could be used in one of several ways. For example, in a vertical network the author may specify both a palette and the colors of objects using only that palette because they know that all receivers have similar color capabilities.

Alternatively, when the author expects that their application may be used in a network that includes receivers of varying capabilities, this palette may serve as a hint as to the best colors to use. In either case the author may specify a color palette by using the 'clut' property documented below.

| 'clut' | |
|---|---|
| Value | : <url>\| none |
| Initial | : selected default |
| Applies to | : body |
| Inherited | : yes |
| Percentage Values | : N/A |
| Media type | : tv |

The <url> value above may be used to identify the location of the actual palette. If no <url> value is specified, or there is no 'clut' property in the style sheet or inline, a default palette may be used.

In the table which follows, one embodiment of a palette format is presented. In one embodiment, the MIME type associated with a url that contains a palette in the format defined by the table below may be "application/clut," with an extension of ".clt". In addition, user agents and HTML applications may accept cluts in the format used by "png" images. The types of these cluts may be the same as entire png images.

Usage Example (Using Inline Style):

<BODY style="http://cnn.com/demoClut.clt">

| Format of palettes of type application/clut: | | | |
|---|---|---|---|
| | No. of bits | Identifier | Notes |
| PaletteResource( ) { | | | |
|   color_model | 8 | uimsbf | The value of 1 for the color model may be used to indicate RGB, whereas the value 2 is used to indicate YUV. |
|   nb_colors | 16 | uimsbf | The value in nb_colors is the number of colors in the palette. |
|   first_color | 8 | uimsbf | The purpose of the first_color value is to allow multiple resources, each specifying their own palette, to share the color space. |
|   for (i=0; i<n; i++) { | | | The first, second, and third amounts (amt_first, etc.) refer to the amount of RGB or YUV, depending upon the value of color_model. The value in alpha (amt_transparency) represents transparency with 0 being transparent and 255 being opaque. |
|     amt_first | 8 | uimsbf | |
|     amt_second | 8 | uimsbf | |
|     amt_third | 8 | uimsbf | |
|     amt_transparency | 8 | uimsbf | |
|   } | | | |
| } | | | |

3.1.2 Alpha Properties

Use of an application-specific palette allows an author to specify the alpha channel corresponding to a particular index. Below is one embodiment illustrating how alpha properties may be specified.

'alpha'
    Value    :    <hexadecimal-integer> | <percentage> | <normalized-number>
    Initial    :    #FF
    Applies to    :    All elements
    Inherited    :    yes
    Percentage Values    :    percent opacity
    Media type    :    tv Usage Example:

<EM color=#008080 style="alpha:#C0">

In one embodiment, the value #FF is fully opaque and the value #00 is fully transparent. The normalized-number may range between 0.0 (fully transparent) and 1.0 (fully opaque). Similarly, 0% may indicate full transparency and 100% fully opaque. These same terms may be used with similar meanings in the additional properties illustrated below.

'background-alpha'
    Value: <hexadecimal-integer> | <percentage> | <normalized-number>
    Initial:    #FF
    Applies to:    All elements
    Inherited:    no
    Percentage Values:    percent opacity
    Media type:    tv Usage Example:

<BODY style="background: black; background-alpha: #00">

'border-alpha'
    Value: <hexadecimal-integer> | <percentage> | <normalized-number>
    Initial:    #FF
    Applies to:    All elements
    Inherited:    no
    Percentage Values:    percent opacity
    Media type:    tv
'border-top-alpha'
    Value: <hexadecimal-integer> | <percentage> | <normalized-number>
    Initial:    #FF
    Applies to:    All elements
    Inherited:    no
    Percentage Values:    percent opacity
    Media type:    tv
'border-bottom-alpha'
    Value: <hexadecimal-integer> | <percentage> | <normalized-number>
    Initial:    #FF
    Applies to:    All elements
    Inherited:    no
    Percentage Values:    percent opacity
    Media type:    tv
'border-left-alpha'
    Value: <hexadecimal-integer> | <percentage> | <normalized-number>
    Initial:    #FF
    Applies to:    All elements
    Inherited:    no
    Percentage Values:    percent opacity
    Media type:    tv -continued

```
'border-right-alpha'
    Value: <hexadecimal-integer> | <percentage> |
                <normalized-number>
        Initial:                #FF
        Applies to:             All elements
        Inherited:              no
        Percentage Values:      percent opacity
        Media type:             tv
'outline-alpha'
    Value: <hexadecimal-integer> | <percentage> |
                <normalized-number>
        Initial:                #FF
        Applies to:             All elements
        Inherited:              no
        Percentage Values:      percent opacity
        Media type:             tv
```

3.2 Positioning of Graphics on Top of Video

An HTML developer may use Cascading Style Sheets (CSS) to specify relative or absolute positioning of graphics on top of video. Additionally, CSS may be used to specify other characteristics as well, such as a border, associated with the visual appearance of a graphic or text block.

In one embodiment, the size of the OSD may be defined as the size of the block (div) whose name has been defined to be "osd." If there are no such blocks, the size may be the size of the first division in a top level window. Where a set-top box cannot create an OSD of exactly that size, the closest available size to the specified size may be used. The examples below illustrate how graphics may be positioned relative to background video. The resulting display for each of the examples is the same, given the assumptions stated below in the descriptions.

In this first example, the background is set to a broadcast video via a url by using a background-image attribute. In this case it is assumed that the application has been granted the tuning privilege and therefore the tuner is tuned to the station carrying the Family-Videos network and the default video and audio is displayed.

First Example of Positioning images on top of video

```
<html>
<head>
<title>example</title>
</head>
<body style="background-image: url(broadcast://family-videos.com)>
<div style="position: absolute; left: 200px; top: 80px; color=gray; border:
thin solid red">
<div style="position: absolute; left: 10px; top: 10px; font-size=18pt;
    line-height=120%; color=yellow; border: thin solid yellow;
    background-alpha: #01; compose-rule: src">
<p>Nicolas a 18 mois
</div>
<img src="pict.gif">
</div>
</body>
</html>
```

In the second example, it is assumed that the television has already been tuned to the Family-Videos network.

Second Example of Positioning images on top of video

```
<html>
<head>
<title>example</title>
```

Second Example of Positioning images on top of video

```
</head>
<body style="background-image: url(broadcast://current); ">
<div style="position: absolute; left: 200px; top: 80px; color=gray; border:
thin solid red">
<div style="position: absolute; left: 10px; top: 10px; font-size=18pt; line-
        height=120%; color=yellow; border: thin solid yellow;
        background-alpha: #01; compose-rule: src">
<p>Nicolas a 18 mois
</div>
<img src="pict.gif">
</div>
</body>
</html>
```

In the third example, it is once again assumed that the television has already been tuned to the Family-Videos network and a transparent color for the background is explicitly selected (though this would be the default anyway).

ThirdExample of Positioning images on top of video

```
<html>
<head>
<title>example</title>
</head>
<body style=" background-color: transparent">
<div style="position: absolute; left: 200px; top: 80px; color=gray; border:
        thin solid red">
<div style="position: absolute; left: 10px; top: 10px; font-size=18pt;
        line-height=120%; color=yellow; border: thin solid yellow;
        background-alpha: #01; compose-rule: src">
<p>Nicolas a 18 mois
</div>
<img src="pict.gif">
</div>
</body>
</html>
```

The fourth example shows that the background need not be specified at all, assuming again that the television has already been tuned to the Family-Videos network.

FourthExample of Positioning images on top of video

```
<html>
<head>
<title>example</title>
</head>
<div style="position: absolute; left: 200px; top: 80px; color=gray; border:
        thin solid red">
<div style="position: absolute; left: 10px; top: 10px; font-size=18pt;
        line-height=120%; color=yellow; border: thin solid yellow;
        background-alpha: #01; compose-rule: src">
<p>Nicolas a 18 mois
</div>
<img src="pict.gif">
</div>
</body>
</html>
```

Some set-top boxes may lack the resources to to simultaneously play video and display a full OSD at the same time. Therefore, to account for this possiblity, an HTML application on one of these boxes may not attempt to interpret any content on those boxes unless a META element, as shown below, is used to indicate that the content was designed specifically for these boxes.

Header Meta-data:

<META name="tv-use" content="full-screen">

3.3 When to Render Graphics

When rendering graphics as they are downloaded, it sometimes makes sense to delay displaying to the viewer until at least a subset of the resources, which have been deemed as essential by the content creator, have been downloaded. In one embodiment, a content creator may label the essential subset of resources by identifying them using a directive such as a "prerequisite" meta-data header. For example, the following indicates that no rendering for the page may occur prior to acquiring "background.mpg"

<META name="prerequisite" content="http://www.cnn.com/background.mpg">

In addition to indicating that certain resources may be required prior to rendering, a content author may further control the rendering through the use of a render-policy and/or render-timeout properties as described below.

render-policy: progressive |layoutcomplete | loadComplete

Applies to: Body

Initial: progressive

Inherited: no

Percentage: N/A

The progressive rendering policy indicates that displaying can start as soon as the essential resources (those marked as prerequisites in meta-data headers) have been acquired. With this policy, as resources are acquired, they are incorporated into the rendered and displayed graphics.

The layoutComplete rendering policy indicates that the rendered image may not be displayed until the software has acquired sufficient information to determine the complete on-screen layout and has acquired those resources labeled as prerequisities. This policy prevents objects from appearing to move around as the rendered graphics incrementally appear onscreen.

The loadComplete rendering policy indicates that the graphics may not be displayed until all resources that will be used for rendering the display have been downloaded. The only difference between the loadComplete rendering policy and labeling all resources as prerequisites, is that in the first case the OnLoad event will have been delivered to the appropriate handler, if any, prior to rendering, and hence may affect the rendered view.

In certain circumstances the specified rendering policy may not be possible, i.e., if a prerequisite resource has been removed from the carousel and acquisition via a modem has been denied by the viewer. In one embodiment, if no timeout for this loading has been specified, then the timeout may default to an indicated value (15s) as shown in the render-timeout property below. If a timeout occurs, and at least all of the prerequisite resources have been acquired, what is available for the new page may be displayed, independent of the specified rendering policy. If some of the prerequisite resources have not been acquired, then it may be preferable, if possible, for the display to show the previous page, if any. If this is not possible, then either an error message may appear or the box may render and display those resources which it has been able to acquire.

| render-timeout | none | <time> |
|---|---|---|
| Initial | 15s | |

In any case, while the box is acquiring the resources for the new page, it may be preferable to continue to display the old page, and, if possible, allow the viewer to interact with the old page.

Scene Transitions

In one embodiment, all user agents may be required to comply with the following two requirements:

if the element which contains the video neither moves nor changes size during a transition from one page to another, there will be no video glitch; and if the size or location of an element containing video does change during a transition from one page to another, the changes in video and graphics will be closely synchronized with one another.

3.4 Video Positioning and Resizing

In addition to considering video as being a virtual underlying plane, the content author may place video boxes within html content by using "broadcast:" as the "src", or as the source of "data" of an HTML element, for which location and/or size are specified. In particular, the location can be specified through the use of CSS.

The examples below demonstrate how a "broadcast:" url may be used in an IMG or OBJECT element to request a particular scaling size.

```
<IMG height=300 width=400 style="position:absolute; left:200px;
    top:80px" src="broadcast://current ">
<OBJECT height=300 width=400 data="broadcast://current
    "></OBJECT>
```

Both of the examples above request that the currently tuned channel (identified by the url, "broadcast:") be scaled to the size of 300 by 400. The first example also demonstrates how CSS properties can be used to position the resulting video box. Although the actual size and position of the video may be partly determined by the capabilities of both the set-top box and the drivers supplied for given hardware, applications should attempt to position and scale the video as specified by the content author.

3.5 Support for MPEG Stills

HTML applications may also support the displaying of still images, such as MPEG I-Frames, in either the video plane or in the multi-plane graphics layer. Because set-top boxes frequently have special purpose hardware for efficient rendering of MPEG, MPEG images are particularly appropriate for the television environment. MPEG I-frames may be recognized by the MIME type of image/mpeg and will have an extension of mpg.

The following example demonstrates the use of an MPEG I-Frame.

```
<html>
<head>
<title>example</title>
```

-continued

```
    </head>
        <body style="background-image:url(http://pepsi.com/pepsi-
           ad.mpg)">
    </body>
</html>
```

3.6 Control of Audio

This section deals with playing of audio from memory and controlling the audio stream after it has been selected. The CSS aural properties can be used to control the audio stream and audio being played from memory. Aural style sheets allow content developers to control the volume, allow the presentation of audio icons (cues), and even allow the developer to control spatial properties and mixing. These style sheets may further support the volume properties, the pause properties, and the mixing properties. HTML itself provides a way to specify an audio element using the <object> tag. There are currently a few events defined on this element: onlayoutcomplete, onmouseenter, onmouseleave, onreadystatechange.

Although CSS provides a way to support volume control, a Javascript object may be used to implement 'mute.' The reason for this requirement is that the object needs to remember the previous volume setting, so that when the sound it turned back on, it will immediately be set back to the volume to which it was set prior to muting.

4. Obtaining Non-AV Resources

Applications and data may be obtained from sources including broadcast or point-to-point (e.g., over a return channel via modem). In one embodiment, HTML applications may provide access to broadcast resources via the broadcast: URL protocol, as well as those that are carried within a broadcast http: protocol (bhttp). Access via the broadcast: protocol is as described above. For the bhttp protocol, whose client-side behavior is as described below, the client side treats the broadcast stream as a cache.

4.1 Access to Broadcast Resources 4.1.1 Access Via the Broadcast: URL Protocol

The HTML/JS content developer may access non-AV broadcast resources using the broadcast: protocol in a way that is similar to the way they use the broadcast: protocol to access AV resources.

An Informal Description of the Scheme for Non-AV Resources

The description here differs from that provided in the previous section in that path_segments have been added to allow specification of particular data streams.

broadcast: {//<service_address>{; <component_list>}}{/<path_segments>}

A service_address is defined as follows:

```
service_address ::= channel_name | current
where:
channel_name    specifies a DNS-style name that uniquely identifies the
                channel,
and
current         specifies the service currently selected.
```

As stated in the previous section, the component_list is a comma-separated list selecting specific components in the stream. The component_list is defined as follows:

```
component_list  ::= component *( "," component )
component       ::= stream_type "=" ( track_tag | "default" | "current" |
                    "none")
stream_type     ::= "video" | "audio" | "data" | "subtitle" | "teletext"
```

The presence of path_segments in a URL indicates that it references a specific module in the data carousel associated with the service_address. For example, the URL "broadcast://tfl.fr/background.png" refers to the background.png module on the default data carousel.

EXAMPLES broadcast:/background.png
    Load the module background.png from the default data carousel on the current service.

broadcast://current;data=htp0/
    Select the data carousel with track_tag "htp0", examine the directory module and load the "default" module in that directory (e.g., index.htm).

Some applications may require the ability to load a specific module within a data carousel. For example, the following HTML loads the background.png module from the default carousel and uses it as a background image.
<BODY background="broadcast:/background.png">

During a carousel request, typical HTML events which may be dispatched include.
    Load If the request succeeded, a load event is dispatched after the URL is finished loading.
    Error If the request is denied or otherwise invalid an error event is dispatched.
    Abort If the user aborts the request before it complete, an abort event is dispatched.

Resident applications (such as a control task, or EPG) may require the ability to automatically launch an application during service selection. In these instances a URL of the form broadcast://cnn.com; data—htp0/ informs a browser to automatically execute the default module on a specific data carousel.

Note: The default module may be selected by checking the specified directory for the following modules. The first module name that exists is automatically loaded.
    BHTTP
    Index.htp
    Index.htm A simpler URL of the form "broadcast:/" informs the browser to automatically execute the default module in the default carousel of the currently selected service.

4.1.2 Access Via the Http: URL Scheme and the Broadcast Carousel

In one embodiment, HTML pages may use "http:" URLs to load resources from the carousel. In particular, the HTTP cache may be enhanced to automatically cache HTTP entities from the data carousel. Therefore, the http: URL handler will be able to load HTTP entities directly from the HTTP cache without opening an HTTP connection to the origin server. Hence, HTML pages that use an "http:" URL to reference HTTP entities may not notice any difference between resources retrieved from the broadcast and those retrieved using the client/server HTTP URL protocol.

Figure 4:
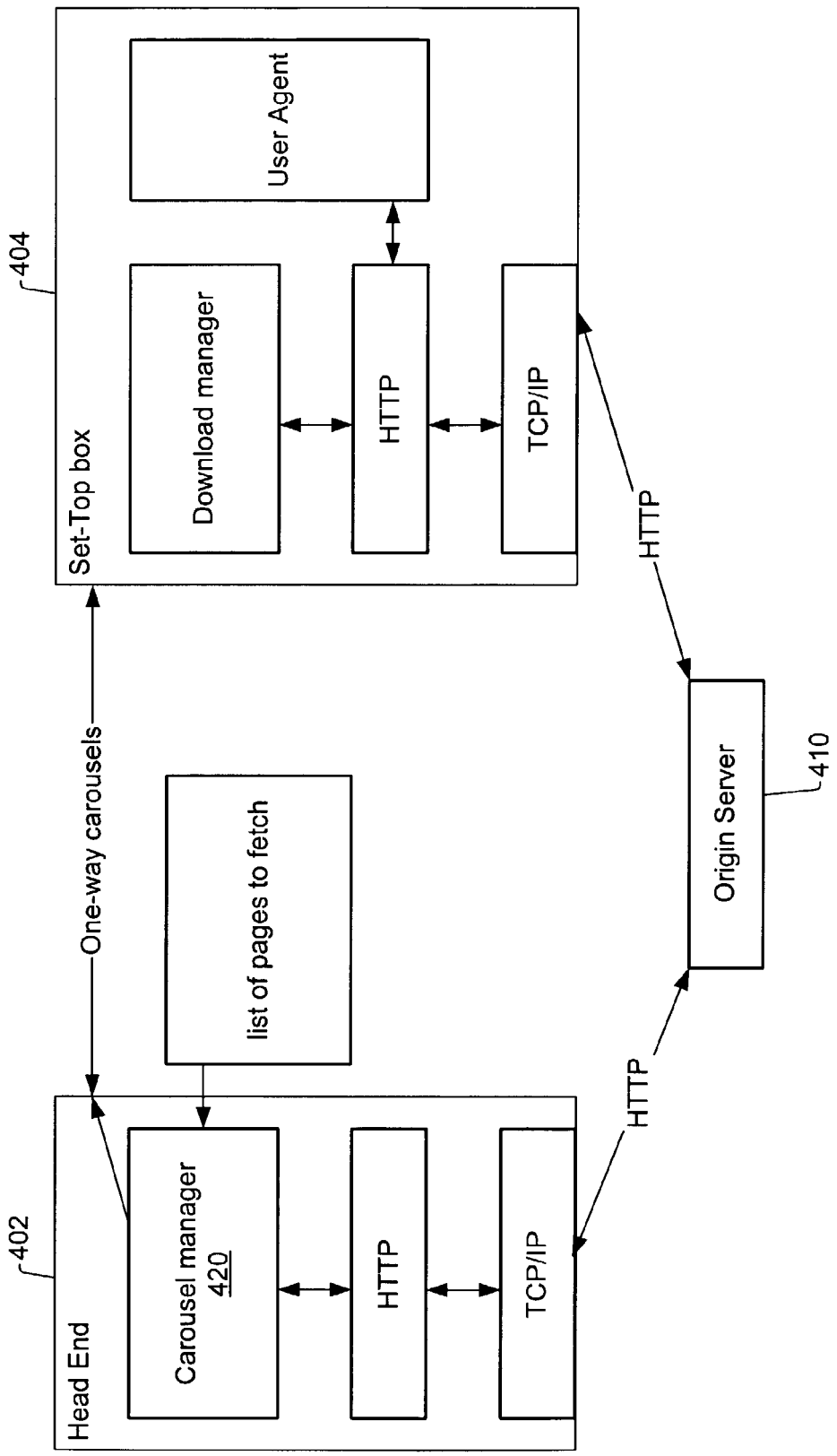
FIG. 4 is a diagram of one embodiment of a television system.

One embodiment of such a model is illustrated in FIG. 4. In the example of FIG. 4, the Head End 402 is acting as a proxy, is responsible for fetching data from the Origin Server 410 which has been requested by the carousel manager 420 (through as many hops as needed), and for placing the proper cache headers according to HTTP syntax and semantics (based upon expires header). The set-top-box 404 may then populate its cache from the carousel. The Expires entity-header field may gives the date/time after which the response is considered stale.

In response to detecting an http url, the client-side may first check its local cache. If the requested data is not found in the cache, the client may check the current carousel if any, possibly retrieving data from the carousel. Alternatively, it may send an HTTP request for the specified URL.

In order to allow proper cache behavior, the carousel may provide expiration dates and other cache control information in HTTP headers. For example, such information may include:
1. Cache-Control (HTTP 1.1) header information that specifies the maximum amount of time that a particular page may be considered to be fresh.
2. In a response to either the head-end or the client, the origin server may add the following headers in order to allow efficient and accurate caching:
   expires, indicating the data/time after which the page may be considered stale;
   last-modified, indicating the last time the data was modified at the origin server; and
   ETag (HTTP 1.1) data, for use with conditional requests, that provides a value indicative of the current page (e.g., some generation number or checksum).
3. Conditional get requests that require the set-top-box to verify either the last-modified value or the ETag value will result in an appropriate request to the origin server, which may return the Not Modified status code if the data is still valid. However, the set-top box may be configured to "believe" the expiration time provided in a header. Note that the server-side may modify the actual expiration time from the value to which it was set by the Origin Server.

It is noted that since network congestion can delay a response, revalidation of data which becomes obsolete during transit could result in an infinite loop. Consequently, HTTP 1.1 specifies that a response may not be revalidated in order to avoid infinite loops. This rule may be followed whether the data comes from the carousel or directly from the origin server.

4.1.3 Relative URLs

The use of relative URLs, which specify neither "http:" nor "broadcast:", may work with either protocol. In one embodiment, relative URLs may be automatically translated to one containing the same prefix that was used to obtain the page which contained the reference. Therefore, if a page was obtained using the "broadcast:" URL, then all relative references within that page may also be obtained using the "broadcast:" URL. Because it is possible that initial pages of an application may be downloaded via "broadcast:", it is possible to author applications which never explicitly specify either "broadcast:" or "http:" yet will perform correctly.

4.2 Modem Control

In Europe, and elsewhere, local communications are still expensive and it might be necessary to warn the user and perhaps display the communication price. While it may be up to the system to actually open and close connections, it may be useful for the application to notify the system when it is finished with a system. Also, in many networks, it is common for different applications to require connections to different phone numbers, rather than to a single phone number associated with a particular Internet Service Provider (ISP). In such systems it is common for the different numbers to be associated with a single modem bank with the different numbers being used for accounting and other information. Hence, the HTML/JS application needs to notify the system when it finishes using a connection and needs to be able to request a connection, providing appropriate parameters. Therefore, various embodiments may support the following methods on the navigator.modem object.

navigator.modem.disconnect( )
   indicates to the system that the application has finished using the connection. There may be no events associated with completion.
If an application invokes the following method:
navigator.modem.connect(string parameter, int ms_timeout), the string parameter could contain, for example, a phone number to which the system may connect. The ms_timeout parameter may be used to indicate how long (e.g., in milliseconds) the system may try to connect. The 'modem' object may be configured to
   provide the connection status as a read-only property.
The system may automatically generate connection events when something happens on the modem. Examples of such connection events include: success, failure, and disconnect_occurred.

4.3 Caching Hints—Pre-Requisite, Link, and Prefetch

There are at least two important clues that may be present within an HTML application to aid the HTML/JS client-side application in determining which resources have higher caching priority. The two clues are represented by the pre-requisite meta data in the header and the link style which is used to indicate which pages, though not needed immediately, may soon be requested by the application.

Pre-Requisite Meta Header

As explained above and illustrated below, all resources which are labeled as a pre-requisite must generally be available prior to rendering the corresponding page for presentation.
   <META name="prerequisite"content="http://www.cnn.com/background.mpg">

Consequently, pre-requisite resources may be identified and given a higher priority for caching.

Using the Link Data for Pre-Fetching

In addition to the above, a link element, which may appear in the <head> portion of a page, indicates resources that may be desired by the viewer of the current page. Therefore, resources listed in this element are also good candidates for pre-fetching into the cache.

However, certain caveats must be observed. For example, if a CSS document is listed in the link element, it is possible that it may be applied to the current document rather than to a document which would be cached for later use. In order to avoid such a possibility, a new value, prefetch, is introduced for the rel attribute. If a resource is indicated in a link statement in the head, and it is identified as having a prefetch relationship, then the set-top box may determine that it is a good candidate for caching.

<link rel="prefetch">

4.4 An Event that Indicates that a URL was Updated

One of the advantages of interactive television is that the viewer's presentation can be updated in real-time. For example, if there is a new goal scored on a soccer game, the viewer may want to receive an update even though they are watching a movie. Such an update can be broadcast by changing the content corresponding to a URL. This section describes how applications can be notified when the content corresponding to a URL changes, using a URLEvent.

The target of a UrlEvent generated by the user agent is determined by the user agent according to the following rules:

1. If the URL whose status has changed is identified as the attribute's value of the corresponding node type as listed in the table below, then the UrlEvent is delivered by the user agent to the corresponding node.
2. If the URL whose status has changed is the url for the page itself, then the UrlEvent will be delivered to the body.

| Attribute | Corresponding Node |
|---|---|
| background | Body |
| src | Image |
| data | Object |
| href | Link |
| src | Input |
| src | Frame |
| src | IFrame |

Attributes url of type DOMString, readonly
  Identifies the URL from which the event was generated.

Methods initUrlEvent
  The initUrlEvent method is used to initialize the value of a UrlEvent created through
    the DocumentEvent interface.
    Parameters
    typeArg of type DOMString
      Specifies the event type.
    canBubbleArg of type boolean
      Specifies whether or not the event can bubble.
    cancelableArg of type boolean
      Specifies whether or not the event's default action can be prevented.
    urlArg of type DOMString
      Specifies the Event's url.

The different types of UrlEvents that can occur are:

URLInserted
  The URLInserted event occurs when a URL is added to the carousel.
  Bubbles: Yes, Cancelable:No, Context Info: url URLUpdated
  The URLUpdated event occurs when a new version of an URL is created on the carousel.
  Bubbles: Yes, Cancelable: Yes, Context Info: url URLRemoved
  The URLRemoved event occurs when a URL is removed from the data carousel.
  Bubbles: Yes, Cancelable: No, Context Info: url The default action in the case of URLUpdated (which can be cancelled by calling preventDefault( )) is to reload the content of the associated url). There is no default action for URLInserted or URLRemoved.

Also, note, that it is guaranteed that the events will be delivered in a top-down order; hence, if the body changes, then the event representing the update of the url associated with the body will be delivered prior to delivering any events concerning urls referred to by the body.

Note that the above event can be signaled in the carousel by carrying a delta directory that indicates differences between the last directory and the current directory. That way, an implementation need not download the entire content before it knows whether the app is going to use it or not—it need only find out that there's a new version available.

The Cache Object

Introduction to Dynamic Cache Hints

Since typically the amount of information that can be presented on a television screen is substantially less than contained in a page that is typically viewed on a PC, an author creating content for television will most often spread the same amount of information over multiple pages. Hence, the viewer will typically "scroll" between pages, and their navigation through a page can be a good indicator of which resources will be needed next. An author making use of such information by conveying hints based upon this navigation to the user agent can enable much better performance on lower end clients.

A Host Cache Interface

The cache interface supports two methods, prefetch and remove. The prefetch method specifies both the URL associated with the resource to be prefetched as well as a priority indicating how likely it is that the viewer will need that resource.

The cache priority value is a non-negative integer. The author can use a cache priority value of 0 to indicate that the referenced content is useful, but that the author may be unsure of its likelihood of use in comparison with other items that they are requesting to be cached. The author can use a cache priority value of 1 to indicate the belief that caching the specified resource is very important. A very large value for the priority indicates that a resource will likely not be used (hence informing the user agent that it may reclaim the memory currently used to hold the URL's associated resource in cases where it is needed).

The remove method may be used to remove a cached copy of the resource associated with the URL argument. Since it is to be removed from the cache, and not just invalidated, the system will not waste resources re-validating the entry. Note that invoking the remove method is different from assigning a very large integer as the cache priority value in that assigning such a large integer value only makes the space used to store that resource more available for garbage collecting and/or to hold high priority resources.

```
Interface cache {
void prefetch(in DOMString URL, in short priority);
void remove (in DOMString URL);
};
```
Binding of the Cache Interface to Script The Cache Object, which implements the cache interface above, is accessible as a property of the Navigator (Navigator::cache).

Object cache

The cache obect has the following methods:

prefetch(URLArg, priorityArg)—This method does not return a value.
            The URLArg is of type String.
            The priorityArg is of type Number.
        Remove(URLArg)—This method does not return a value.
            The URLArg is of type String.

The farPrefetch Method

Sometimes the size of the resources needed for a given application is very large, and, in this case, it is often true that many of the resources, e.g., fonts, are actually sharable with other applications on different services. When such is the case, the shared resources are often bundled together and transmitted on a single service. Hence, there is a need for an application to be able to obtain resources from another service, which will usually require temporarily changing the tuner to a different frequency and/or at least choosing a different service that is carried on that frequency, caching the resources from that other service, and tuning back to the original service. Another example use case for this scenario is the case where a viewer wants to download mail or chat information or a game, then interact with the downloaded data while watching video that is broadcast on a different service from the downloaded data.

In one embodiment, the following JS method is provided to permit an application to tune to a different service and download information from that service, then automatically come back to the original service:

void navigator.cache.farPrefetch(carouselUrl, ArrayOfUrlsToLoad, functionToCallWhenDone)

Where the carouselURL is identified via the tvx: protocol.

The following actions may occur asynchronously when this function is called. First, the permission of the application is checked to ensure that it is allowed to change the service. If this request is permitted, the specified service is tuned, all urls requested are cached, then the tuner/demuxer re-selects the previous service, and the functionToCallWhenDone is invoked. This call may be guaranteed not to cause a kill event to be generated for the application that requested the farPrefetch.

Event Defining Result of farPrefetch Method

The following event may be delivered to the cache object after the farPrefetch completes. The detail value indicates whether all requested resources were obtained or not. That is, in one embodiment, if less than all of the requested resources are obtained, then the farPrefetch may be considered to have failed. The content author should note that they are responsible for requesting all required resources when a farPrefetch is used.

detail read-only property is a Number.

The detail property has the value: 1 for success,
    NaN failure.

The CacheEvent object has the following method:
    initCacheEvent(typeArg, canBubbleArg, cancelableArg, detailArg)
        This method is used to initialize the value of a CacheEvent created through
        the DocumentEvent interface. This method may only be called before the CacheEvent has been dispatched.

The different types of cache events that can be dispatched to navigator.cache are:
    FarPrefetchStatus—This event notifies that a farPrefetch( ) request has completed.

| Bubbles: | No |
|---|---|
| Cancelable: | No |
| Context Info: | detail |

The Interaction Channel

HTML/JS applications may use the modem(s) attached to and/or present within a set-top box to interface with the interaction channel. Two types of modems are considered, an always-on modem (e.g., cable DOCSIS) and a use-time-only modem (e.g., POTS), either or both of which may be accessible from a given set-top box.

Two different uses of interaction channel have proven useful in interactive television. One use, which is also commonly found in PC applications, is the use of modems to send and/or receive a substantial amount of data. Since a substantial amount of data will be exchanged, the overhead of establishing a connection such as that associated with PPP is insignificant. A different use, however, has proven to be a source of major revenue generation for pay television operators: the capability to call a premium phone number, optionally exchange a few bytes, and hang up. The amount of time required to establish a PPP link in this second type of usage is therefore excessive, and, hence, undesirable.

In addition to the issue of use as described above, also important is the degree of control that an application may exercise over a modem connection. In one embodiment, if an application has not explicitly opened a link, the application may automatically open a link (e.g., using a network-dependent connection string), or use an existing open link, when access to content corresponding to an "http:" url is required by the application.

In order to permit developers to exercise control over high level protocols, such as PPP, the links structure described below may be provided. Further, to allow applications direct access to raw data where high level protocols cause too much overhead, and to allow those applications to dial premium phone numbers through dialup modems, the modem structure described below may be provided.

The Links Structure

The links structure defined below may be used to (1) explicitly control when connections are opened and closed, and (2) specify connection attributes. It also provides methods that allow an application to determine attributes of the link.

A user application may be configured to always select a best link (often designated by the network) and specify that as the default link ([window].navigator.tv.links.default below). In such a case, the author need not always search for a link with particular attributes. However, should an application author determine that they seek a particular type of link, they may directly access the links array ([window].navigator.tv.links[i] below).

---
Object Model Reference:
[window].navigator.tv.links[i]
[window].navigator.tv.links.default
---

The links array is a collection of objects of type TVLink as defined below. Also, the links.default is of type TVLink.

The type property allows the content author to determine the type of link. While the first three types are named according to the standardized protocol that they support, the fourth type refers to a particular product that supports a more lightweight protocol in lower end boxes.

The status property allows an application to determine the current status of the link and the always_on property allows the application to determine whether the link is persistent. If the link is connected and not always on, the application can determine the amount of time that the link has been connected by using the time property.

It is typical in pay television networks for the networks themselves to require the connection attributes to be specified in a network-formatted way. That is, one network may require the application to specify the entire phone number, while another network will only permit an application to specify an index into an array of network-supplied phone numbers, and still a third network may not allow specification of the phone number at all, but only of the username and password. Therefore, the format of the connection string attribute associated with the connect request is network-dependent.

The TVLink object is defined as follows.

---
Properties:
 type         "PPP" | "DVB-RC" | "DOCSIS" | "OTV_Gateway"
              (read-only)
 status       "connected" | "connecting" | "disconnected" |
              "disconnecting"
(read-only)
 always_on    "True" | "False"
 time         int -- # seconds connected (0 if not in "connected"
              state)
 name         String a unique property associated with this link.
---

Methods:
 open(attributes, timeout)—
  This method returns a Number: 1 for OK, −1 if the link that was specified does not exist, −2 if the link is already open, and −4 if permission to open this existing link is denied.
  Note that although this call may fail immediately, the actual connection is asynchronous with the requester being notified via a LinkUp event when the connection has been successfully made. (or by a LinkDown event should the request fail)
  The attributes parameter is String that contains the connection attributes as determined by the content author in consultation with the network (must at least know network-specified format)
  The timeout parameter is Number that contains timeout (in seconds).

close( )
  This method returns a Number: 1 for OK, NaN for failure
  This method may also be asynchronous.
 addEventListener(type, listener, useCapture)
 removeEventListener(type, listener, useCapture)
 dispatchEvent(evt)
  —These methods are the basic methods of the DOM level 2 EventTarget interface.

Events:
 The LinkUp and LinkDown events are of type LinkEvent.
  The LinkEvent object has all of the properties of the Event interface plus the following additional property:
  detail read-only property is a Number.
  Where the detail property has the value:
  1 for normal disconnect,
  2 for line was dropped (by other side),
  3 time-out occurred,
  NaN other failure
 The LinkEvent object has the following method:
  initLinkEvent(typeArg, canBubbleArg, cancelableArg, detailArg)
   This method is used to initialize the value of a LinkEvent created through
   The DocumentEvent interface. This method may only be called before the LinkEvent has been dispatched.
 The different types of link events that can be dispatched to navigator.modem are:
  LinkUp
   This event notifies that a basic modem connection has been established.

---
Bubbles:        No
Cancelable:     No
Context Info:   none
---

LinkDown
  This event notifies that the modem has been disconnected.

---
Bubbles:        No
Cancelable:     No
Context Info:   detail
---

The Modem Structure

The modem structure defined below is used for access to raw data. For example, this structure is useful when an application simply wants to dial a premium phone number, make a connection, and hang up. It can also be used when only a few bytes of information need to be exchanged, and, in such a situation, the higher level protocols required by the links structure above carry too much overhead for such a use.

Object Model Reference:
 [window].navigator.modem

The modem object has the following methods:
 connect(tel, timeout)
  This method returns a Number: 1 for OK, −1 for parameter error, −7 modem is use, NaN other failure.
  The tel parameter is type String that contains telephone number.

The timeout parameter is Number that contains timeout (in seconds).

disconnect( )
    This method returns a Number: 1 for OK, NaN for failure sendData(data, timeout)
    This method returns a Number: 1 for OK, −1 for parameter error, −2 not connected, NaN other failure.
    The data parameter is type String that contains a sequence of byte values 0–255.
    The timeout parameter is Number that contains timeout (in seconds).

receiveData( )
    This method returns a String that contains the available data (empty string if no data available).

addEventListener(type, listener, useCapture)
removeEventListener(type, listener, useCapture)
dispatchEvent(evt)
    These methods are the basic methods of the DOM level 2 EventTarget interface.

The ModemEvent object has all the properties of the Event interface plus the following additional properties:

| detail | read-only property is a Number. |
|---|---|
| The detail property has the value: | >0 for the number of bytes sent, |
| | −2 for line was dropped (by other side), |
| | −3 time-out occurred, |
| | NaN other failure. |

The ModemEvent object has the following method:
    initModemEvent(typeArg, canBubbleArg, cacelableArg, detailArg)
    This method is used to initialize the value of a ModemEvent created through the DocumentEvent interface. This method may only be called before the ModemEvent has been dispatched.

The different types of modem events that can be dispatched to navigator.modem are:

ModemConnect
    This event notifies that a basic modem connection has been established.

| Bubbles: | No |
|---|---|
| Cancelable: | No |
| Context Info: | none |

ModemDisconnect
    This event notifies that the modem has been disconnected.

| Bubbles: | No |
|---|---|
| Cancelable: | No |
| Context Info: | detail |

The detail property has the value:
    −1 for normal disconnect,
    −2 for line was dropped (by other side),
    −3 time-out occured,
    NaN other failure (e.g., authenication error).

ModemReceiveData

| Context Info: | detail |
|---|---|

The detail property contains the number of data bytes available to receive.

ModemSentData
    This event notifies that a basic modem connection sent some data.

| Bubbles: | No |
|---|---|
| Cancelable: | No |
| Context Info: | detail |

5. User Interaction 5.1 Navigation

Focus & Focus Highlight

CSS2 provides a number of ways to control how to highlight focused elements. For example, CSS2 provides three pseudo-classes related to focus navigation: ":hover", ":active", and ":focus". In addition to these pseudo-classes, the html 'tabindex' attribute for input and anchor elements may also be utilized to support navigation. The purpose of this attribute is to allow the viewer to "tab" around the rendered page prior to selecting an element. The value assigned to the tabindex attribute determines the order in which the elements are visited upon tabbing.

Certain interactive television standards provide "nav-x" properties to support navigation using the arrow keys (DOM_VK_UP, DOM_VK_DOWN, DOM_VK_LEFT, and DOM_VK_RIGHT). In particular, both DVB MHP and Association of Radio Industries and Businesses (ARIB) define similar, though not identical, "nav-index", "nav-right", "nav-left", "nav-up" and "nav-down" properties. In both of those specifications, the "nav-index" property is used to associate unique integer values with particular elements as follows.

| 'nav-index' | |
|---|---|
| Value: | <integer> | none |
| Initial: | none |
| Applies to: | All elements that can get focus |
| Inherited: | no |
| Percentage Values: | N/A |
| Media type: | tv |

Because elements with associated "nav-index" properties have associated unique integer values, the content author may then use the set of properties to control navigation between elements.
    nav-up
    nav-down
    nav-left, and
    nav-right There are several differences between DVB-MHP's definition of these properties and the definition provided by ARIB. DVB-MHP permits the use of this property to control navigation between frames by allowing the content author to specify a frame along with an element index to which to transition when the viewer presses the corresponding arrow key. It seems appropriate in high-end receivers to permit navigation between frames using this property, although it is not expected to be an issue in low to mid-size receivers.

Another difference between DVB-MHP's definition of these properties and the definition assigned by ARIB is the behavior specified to occur when the content author does not provide one or more of these properties for various elements. ARIB indicates that if a particular property is not specified for an element, then pressing an arrow key when focused on that element results in no movement of focus. The result of applying this rule to elements for which none of these properties, except the nav-index, have been specified is that one can never navigate out of those elements, if indeed one can navigate to those elements. Additionally, if no nav-index property has been specified for an element, then it is not possible to navigate to that element. DVB-MHP specifies a different default behavior wherein if one of the properties is not specified, then navigation via the arrow keys defaults to the pre-defined user agent behavior.

In one embodiment, if navigational direction is not explicitly controlled, the middleware (similar to the user agent) uses its default behavior for navigation. When the default behavior is not the behavior desired by the content author for a particular move, they may add directives for explicit control to override the undesirable behavior. In this manner, content authors are not required to explicitly re-define all of the behavior that they already find acceptable/desirable. Therefore the default behavior is more closely aligned with the behavior of DVB-MHP. The difference is to allow explicit specification of both "none" and "default" user agent behavior.

| 'nav-up' | |
|---|---|
| Value: | <integer> | none | default |
| Initial: | default |
| Applies to: | All elements that can get focus |
| Inherited: | no |
| Percentage Values: | N/A |
| Media type: | tv |
| 'nav-left' | |
| Value: | <integer> | none | default |
| Initial: | default |
| Applies to: | All elements that can get focus |
| Inherited: | no |
| Percentage Values: | N/A |
| Media type: | tv |
| 'nav-down' | |
| Value: | <integer> | none | default |
| Initial: | default |
| Applies to: | All elements that can get focus |
| Inherited: | no |
| Percentage Values: | N/A |
| Media type: | tv |
| 'nav-right' | |
| Value: | <integer> | none | default |
| Initial: | default |
| Applies to: | All elements that can get focus |
| Inherited: | no |
| Percentage Values: | N/A |
| Media type: | tv |

Usage Example:
<FORM action="http://somesite.com/prog/adduser"method="post"><P>
First name: <INPUT style="nav-index:100; nav-up:105; nav-down:101 "type="text"name="firstname"><BR>
Last name: <INPUT style="nav-index:101; nav-up:100; nav-down:102"type="text" name="lastname"><BR>
email: <INPUT style="nav-index:102; nav-down:103; nav-up:101"type="text"name="email"><BR>
<INPUT style="nav-index:103; nav-down:104; nav-up:102"type="radio"name="gender"value="Male">Male<BR>
<INPUT style="nav-index:104; nav-down:105; nav-up:103"type="radio" name="gender"value="Female">Female<BR>
<INPUT style="nav-index:105; nav-up:104; nav-down:100"type="submit" value="Send"><INPUT type="reset">
</P>
</FORM>

A content developer requiring additional control over navigation may specify key event handlers using Javascript.

5.2 Virtual Keyboard Control

The following CSS property may be used for controlling the automated appearance of a keyboard. This property may be specified on a per-element basis for text, password, and text area elements. Hence, if an application is aware that a particular form element is a zip code for example, and hence entering numbers via the remote control is easier, that may be specified.

| "virtual-keyboard" | |
|---|---|
| Value: | disable | enable | auto |
| Initial: | enable |
| Applies to: | all input elements |
| | Inherited: no |
| Percentage Values: | N/A |
| Media type: | tv |

The value "disable" means that the virtual keyboard is not available when the viewer wants to enter data into the area, i.e., they may enter numbers via the remote control instead. The value "auto" means that when the element to which the property applies receives focus, the virtual keyboard will automatically be presented to the viewer. The value "enable" means that the virtual keyboard will automatically be presented to the viewer when the viewer selects the element to which the property applies. If the viewer's user preferences have indicated that there is an alternate preferred non-virtual keyboard available, then the virtual keyboard may not be displayed even if the value has been set to enable or auto.

An example demonstrating how application writers could prevent the virtual keyboard from appearing for a password type element is:

Input[typ=passwd]{virtual-keyboard:disable}

Similarly, if the user preference indicates that the remote control may be used as a numeric speller, as with a cell phone, then no virtual keyboard will automatically appear. Alternatively, the network operator may specify a system preference if it knows that all viewers will have access to a physical keyboard or a cell phone.

5.3 Key Input

Applications may specify sets of keys for which they request notification by the system when they are in a maximized state. Generally, though not necessarily, they may not receive notification when they are in a minimized state. Notification of certain of the sets of keys will be provided to applications solely on the basis that they requested them.

However, for other keys, the network-supplied task may be queried as to whether or not the application may be presented with the keys that it has requested. Hence, it is possible that applications may not be notified of all key presses to which they have subscribed. HTML applications may specify which keys they wish to receive notification by stipulating sets of key groups shown in the key-list property below. If the system grants the key group request, then notification of the key press is given only to the requesting application and will not be delivered to other (native) applications in the system.

For example, an application may know that a viewer may only be entering digits between 1 and 8, yet wants to be forgiving enough so that if the viewer may enter a 0 or a 9, the channel will not change. In this case, the application can request notification of all of the numeric keys, ignoring anything except the digits between 1 and 8. It is possible that in some networks there will be a pre-defined set of keys that all pages which do not specify otherwise, will receive.

5.4 Key-list Property

HTML type applications may add a CSS property called Key-list that indicates for which key presses an application may be notified. This property may apply to the body element. A content provider wishing more control can use the appropriate javascript to implement more fine-grained control, making use of the on-focus event. All pages using the same style sheet will share the same definition of keys, in which the application is interested. This is a comma-separated list of key-groups (such as navigation, selection, information, numeric, color, alpha, etc). Note that included included below is the reserved_set in the initial value for key-list even though these keys are typically not explicitly so marked on a typical remote control. Therefore, even though they're in the initial set, there may be no way for a viewer to use these keys. An application writer is therefore advised to exercise care when requesting that the viewer press these keys (e.g., have a fallback available in the event that these keys are not available to a particular viewer.)

"key-list"
| | | |
|---|---|---|
| Value | : | <key-group> + \| none |
| Initial | : | scroll_set, navigation_set, selection_set, numeric_set, punctuation_set, alpha_upper_set, alpha_lower_set, reserved_set |
| Applies to | : | body element |
| Inherited | : | no |
| Percentage Values | : | N/A |
| Media type | : | tv |

Where key groups may be:

| KEY GROUP | KEYS |
|---|---|
| user_information_set | HELP, INFO |
| scroll_set | HOME, PAGE_UP, PAGE_DOWN, END |
| navigation_set | LEFT_ARROW, RIGHT_ARROW, DOWN_ARROW, UP_ARROW |
| selection_set | CANCEL, ENTER, UNDO |
| vcr_control_set | STOP, PLAY, PAUSE, RECORD and SINGLE_STEP_FORWARD, SINGLE_STEP_REVERSE, FAST_FORWARD, FAST_REVERSE |
| edition_set | CUT, COPY, PASTE |
| teletext_set | MIXING, MAGNIFY, CONTENT, REVEAL |
| color_set | RED, GREEN, BLUE, YELLOW |
| numeric_set | 0 to 9 |
| Punctuation_set | all non-alphanumeric codes in (0x20 to 0x7f) |
| alpha_upper_set | all alphabetic codes in (0x41 to 0x5a) |
| alpha_lower_set | all alphabetic codes in (0x61 to 0x7a) |
| network_set | all codes in (0x0080 to 0x8f) |
| manufacturer_set | all codes in (0x0090 to 0x97) |
| Extended_set | all ISO-LATIN codes in (0x00a0 to 0xff) |
| sound_set | VOLUME_DOWN, VOLUME_UP, MUTE_AUDIO |
| station_set | CHANNEL_UP, CHANNEL_DOWN, PREVIOUS_CHANNEL, RADIO_TOGGLE, TV_TOGGLE |
| reserved_set | TAB, BACKSPACE, RETURN |

Usage Example:

<BODY style="key-list: selection_set, navigation_set">

5.5 Key Codes

There are generally two major groups of key events.

The first contains the textEvent event. The textEvent event indicates that text information has been entered, either in the form of printable characters or non-printable text information such as modifier keys. These textEvent events are sometimes, but not necessarily, accompanied by the events of a second major groups of key events—keydown and keyup.

TextEvent

This event indicates that text information has been entered. The text information entered can originate from a variety of sources. It could, for example, be a character resulting from a keypress. It could also be a string resulting from an input method.

The keydown and keyup events comprise the second group of key events. These events are fired to indicate the physical motion of the keys on the character generation device. Depending on the input system being used, textEvent events may or may not be generated for each pair of keydown and keyup events.

Keydown

The keydown event occurs when a key is pressed down.

Keyup

The keyup event occurs when a key is released.

All these events may share the following attributes:

TextEvent, keydown, keyup:
   bubbles: yes
   cancelable: yes
   context info: 0
   context outputString: output generated by the key event or null.
   context keyVal: Unicode character generated by the key event, or 0.
   context virtkeyVal:
                virtual key code generated by the key event if the key
                event has not a Unicode value, or DOM_VK_UNDEFINED. Here is
                the list of virtual key codes:

```
const unsigned long DOM_VK_UNDEFINED = 0x0;
const unsigned long DOM_VK_RIGHT_ALT = 0x01;
const unsigned long DOM_VK_LEFT_ALT = 0x02;
const unsigned long DOM_VK_LEFT_CONTROL = 0x03;
const unsigned long DOM_VK_RIGHT_CONTROL = 0x04;
const unsigned long DOM_VK_LEFT_SHIFT = 0x05;
const unsigned long DOM_VK_RIGHT_SHIFT = 0x06;
const unsigned long DOM_VK_LEFT_META = 0x07;
const unsigned long DOM_VK_RIGHT_META = 0x08;
const unsigned long DOM_VK_CAPS_LOCK = 0x09;
const unsigned long DOM_VK_DELETE = 0x0A;
const unsigned long DOM_VK_END = 0x0B;
const unsigned long DOM_VK_ENTER = 0x0C;
const unsigned long DOM_VK_ESCAPE = 0x0D;
const unsigned long DOM_VK_HOME = 0x0E;
const unsigned long DOM_VK_INSERT = 0x0F;
const unsigned long DOM_VK_NUM_LOCK = 0x10;
const unsigned long DOM_VK_PAUSE = 0x11;
const unsigned long DOM_VK_PRINTSCREEN = 0x12;
const unsigned long DOM_VK_SCROLL_LOCK = 0x13;
const unsigned long DOM_VK_LEFT = 0x14;
const unsigned long DOM_VK_RIGHT = 0x15;
const unsigned long DOM_VK_UP = 0x16;
const unsigned long DOM_VK_DOWN = 0x17;
const unsigned long DOM_VK_PAGE_DOWN = 0x18;
const unsigned long DOM_VK_PAGE_UP = 0x19;
const unsigned long DOM_VK_F1 = 0x1A;
const unsigned long DOM_VK_F2 = 0x1B;
const unsigned long DOM_VK_F3 = 0x1C;
const unsigned long DOM_VK_F4 = 0x1D;
const unsigned long DOM_VK_F5 = 0x1E;
const unsigned long DOM_VK_F6 = 0x1F;
const unsigned long DOM_VK_F7 = 0x20;
const unsigned long DOM_VK_F8 = 0x21;
const unsigned long DOM_VK_F9 = 0x22;
const unsigned long DOM_VK_F10 = 0x23;
const unsigned long DOM_VK_F11 = 0x24;
const unsigned long DOM_VK_F12 = 0x25;
const unsigned long DOM_VK_F13 = 0x26;
const unsigned long DOM_VK_F14 = 0x27;
const unsigned long DOM_VK_F15 = 0x28;
const unsigned long DOM_VK_F16 = 0x29;
const unsigned long DOM_VK_F17 = 0x2A;
const unsigned long DOM_VK_F18 = 0x2B;
const unsigned long DOM_VK_F19 = 0x2C;
const unsigned long DOM_VK_F20 = 0x2D;
const unsigned long DOM_VK_F21 = 0x2E;
const unsigned long DOM_VK_F22 = 0x2F;
const unsigned long DOM_VK_F23 = 0x30;
const unsigned long DOM_VK_F24 = 0x31;
const unsigned long DOM_VK_RC_POWER = 0x32;
const unsigned long DOM_VK_RC_TV = 0x33;
const unsigned long DOM_VK_RC_SET_UP = 0x34;
const unsigned long DOM_VK_RC_INFO = 0x35;
const unsigned long DOM_VK_RC_RADIO = 0X36;
const unsigned long DOM_VK_RC_NAV = 0x37;
const unsigned long DOM_VK_RC_PIP = 0x38;
const unsigned long DOM_VK_RC_MENU = 0x39;
const unsigned long DOM_VK_RC_TEXT = 0x3A;
const unsigned long DOM_VK_RC_HELP = 0x3B;
const unsigned long DOM_VK_RC_SELECT = 0x3C;
const unsigned long DOM_VK_RC_EXIT = 0x3D;
const unsigned long DOM_VK_RC_GUIDE = 0x3E;
const unsigned long DOM_VK_RC_RED = 0x3F;
const unsigned long DOM_VK_RC_GREEN = 0x40;
const unsigned long DOM_VK_RC_YELLOW = 0x41;
const unsigned long DOM_VK_RC_BLUE = 0x42;
const unsigned long DOM_VK_RC_CHANNEL_UP = 0x43;
const unsigned long DOM_VK_RC_CHANNEL_DOWN = 0x44;
```

-continued

```
            const unsigned long DOM_VK_RC_VOLUME_UP = 0x45;
            const unsigned long DOM_VK_RC_VOLUME_DOWN = 0x46;
            const unsigned long DOM_VK_RC_MUTE = 0x47;
            const unsigned long DOM_VK_RC_INFO = 0x48;
            const unsigned long DOM_VK_RC_CANCEL = 0x49;
            const unsigned long DOM_VK_RC_UNDO = 0x4A;
            const unsigned long DOM_VK_RC_STOP = 0x4B;
            const unsigned long DOM_VK_RC_PAUSE = 0x4C;
            const unsigned long DOM_VK_RC_RESUME = 0x4D;
            const unsigned long DOM_VK_RC_SINGLE_STEP_FORWARD = 0x4E;
            const unsigned long DOM_VK_RC_SINGLE_STEP_REVERSE = 0x4F;
            const unsigned long DOM_VK_RC_FAST_FORWARD = 0x50;
            const unsigned long DOM_VK_RC_FAST_REVERSE = 0x51;
            const unsigned long DOM_VK_RC_CUT = 0x52;
            const unsigned long DOM_VK_RC_COPY = 0x53;
            const unsigned long DOM_VK_RC_PASTE = 0x54;
            const unsigned long DOM_VK_RC_MIXING = 0x55;
            const unsigned long DOM_VK_RC_MAGNIFY = 0x56;
            const unsigned long DOM_VK_RC_CONTENT = 0x57;
            const unsigned long DOM_VK_RC_REVEAL = 0x58;
            const unsigned long DOM_VK_RC_VCR = 0x59;
            const unsigned long DOM_VK_RC_SATELLITE_DEL = 0x5A;
            const unsigned long DOM_VK_RC_CABLE_DEL = 0x5B;
            const unsigned long DOM_VK_RC_TERR_DEL = 0X5C;
            const unsigned long DOM_VK_RC_DISPLAY_CLOCK = 0x5D;
            const unsigned long DOM_VK_RC_SET_CLOCK = 0x5E;
            const unsigned long DOM_VK_RC_COLOR_UP = 0x5F;
            const unsigned long DOM_VK_RC_COLOR_DOWN = 0x60;
            const unsigned long DOM_VK_RC_BRIGHT_UP = 0x61;
            const unsigned long DOM_VK_RC_BRIGHT_DOWN = 0x62;
            const unsigned long DOM_VK_RC_CONTRAST_UP = 0x63;
            const unsigned long DOM_VK_RC_CONTRAST_DOWN = 0x64;
            const unsigned long DOM_VK_RC_PREVIOUS_CHANNEL = 0x65;
            const unsigned long DOM_VK_RC_PREFERENCES = 0x66;
            const unsigned long DOM_VK_RC_PARENTAL_CONTROL = 0x67;
            const unsigned long DOM_VK_RC_BOX_OFFICE = 0x68;
            const unsigned long DOM_VK_RC_PURCHASE = 0x69;
            const unsigned long DOM_VK_RC_PPV_SERVICES = 0x6A;
            const unsigned long DOM_VK_RC_GO_ONLINE = 0x6B;
            const unsigned long DOM_VK_RC_EXIT_APP = 0X6C;
            const unsigned long DOM_VK_RC_SHOW_INTERACTIVE = 0x6D;
            const unsigned long DOM_VK_RC_RECORD = 0x6E;
context inputGenerated:
            false if the key event does not generate any visible
            output, such as the use of a function key or the
            combination of certain modifier keys used in
            conjunction with another key, true if the key event
            normally causes visible output. The value of
            inputGenerated does not guarantee the creation of a
            character, as the event may be canceled.
Context numPad:
            If the number pad was used to generate the key event
            the value is true, otherwise the value is false.
```

While the codes above, and this data structure, are similar to those defined in DOM-Level 3 Key code definitions. Codes have been added for the remote control. These new codes have been named DOM_VK_RC_ . . . (RC for remote control). In one embodiment, the keys on a keyboard which are labeled like these would generate these keys. Also, DOM_VK_HOME has been declared above in lieu of an RC_RIGHT, LEFT, RC_HOME, etc. Other keys are possible and are contemplated.

```
Key event methods
checkModifier
            The CheckModifier method returns true or false,
            depending on whether a single modifier key is
            associated with a KeyEvent. The list of keys below
            represents the allowable modifier parameters
            for this method.
            DOM_VK_LEFT_ALT
```

-continued

```
            DOM_VK_RIGHT_ALT
            DOM_VK_LEFT_CONTROL
            DOM_VK_RIGHT_CONTROL
            DOM_VK_LEFT_SHIFT
            DOM_VK_RIGHT_SHIFT
            DOM_VK_META
Parameters
            modifer of type unsigned long The modifier which the
            user wishes to query.
Return Value
            Boolean     The status of the modifier represented
                        as a boolean
No Exceptions
```

5.6 Event Handlers

In addition to the Document Object Model (DOM) Level 2 listeners, Key events may be directed to legacy key handlers: onKeyDown, onKeyPress, onKeyUp, plus onFocus, onBlur, onChange and onClick, onSubmit.

6. Security

Two types of security which may be required in a receiver include:
  (1) protection for html resources, including both document resources as well as cookies; and
  (2) protected access to receiver resources such as the tuner or modem.

Policies that govern the application of the various security mechanisms may be set by the network and/or by the receiver manufacturer and viewers themselves.

6.1 Protection For Html Resources

Same Origin Mechanism

The same origin policy may be defined in order to restrict one resource's capability to access other resources in such a way as to leave the viewer vulnerable. In particular, when one resource attempts to access one of the object properties shown in the table below, a same origin check is needed.

In one embodiment, the first step of a same origin check it so determine whether the object being referenced was created by the same context as the currently running script. If so, the access is permitted. Otherwise, additional information may be examined to determine whether the url of the accessing document has the same origin as the object being accessed. If the origin is the same, then the access may be permitted; otherwise, the access may be denied.

Two documents may be said to have the same origin if the following elements of the "protocol://host" (where host includes the optional port) are identical:
  the protocol,
  the host, and
  the port.

If any of these values differ, then the access may be denied. It may be assumed that any data that is acquired via the broadcast: is acquired on the same port.

| Object | Property | Access Type | Checked |
|---|---|---|---|
| window | All except location (see below), frames, parent, and top | Read | yes |
|  | All except location (see below) | Write | yes |
| (window.)location | All | Read | yes |
|  | href | Write | yes |
|  | protocol | Write | yes |
|  | toString | (method) | yes |

Mechanism and Rules for Changing the Origin

It is often the case that a single organization may provide multiple servers, but may wish to allow certain documents provided from particular ones of these servers to access certain other documents provided from different ones of these servers. One mechanism to allow such sharing includes permitting a document to change its (document.) domain property. However, such changes may be restricted. For example, in one embodiment it may only change its domain to a proper suffix of its current domain. That is, www.xyz.com may be changed to xyz.com, but not to abc.com. Additionally, at least one period may be required to remain in the new name, so, for example, xyz.com could not be shortened at all. Consequently, if the origins of two different resources were originally www.xyz.com and intranet.xyz.com, both would have to change their domain in order for access to be allowed.

There may be a problem with the mechanism for changing the origin which relates to internationalization. The fact that this mechanism could be easily abused on servers outside the U.S. could open up the resource to all kinds of security attacks. Another potential problem is the granularity of this rule. Two resources from the same domain may not be able to provide mutual access only to one another without permitting other resources in that domain the same access. This problem may be exacerbated by the mechanism that allows resources to change their domain.

One technique that would permit finer granularity of sharing uses a mechanism called a credential. In one embodiment, a credential is a signed statement from one party granting access to one (or more) of its resources to another party. The statement is a formatted chunk of data identifying the grantor, the grantee, the resource to which access is being granted, the permitted actions on that resource (i.e., read, write, or another property), and optionally a date until which that access is being permitted. The credential may be accompanied by a certificate chain, the leaf certificate in the chain identifying the grantor and providing their public key and the root certificate of the chain being identical to one of the root certificates in the receiver.

6.2 Protecting Access to Receiver Resources

Networks often prefer to control access to certain hardware and software receiver resources. Those resources that may be granted to HTML applications which are acquired via the broadcast are enumerated below. The authorization process for granting these privileges to broadcast applications is described in later.

While applications which are obtained directly from the web may be prohibited from executing privileged operations, a special application, configured by or for the network operator known as the UI may access all of the privileged core operations.

In addition to the above, the network may be allowed to specify that certain of the operations below might be allowed to all apps, no matter where they're obtained from. Also, a network may be allowed to furnish domain-name/set-of-privileges pairs.

Privileged Core Operations

The following is a list of operations that may be permitted only when permission to access them is signaled as explained in the next section.
  Download modules from the broadcast
  Download modules from any source
  Switch tracks
  Switch programs (services)
  Connect to a remote server (via a phone or cable modem)
  Make any arbitrary connection
  Allow some modules not to be signed (the directory and initial modules must always be signed)
  Allow the application to become resident in the receiver
  Create or modify the service list
  Use the service list
  Request the viewer sign the data that they are providing for transmission
  Request the viewer approve access to restricted files and/or phone numbers Change some default settings (exactly which settings can be modified depends upon the other privileges granted to the application)

Inform the system that it need not clean (non osd) memory after execution

Inform the system that it need not clean the osd memory after execution

Change the EIT cache window

Release cache reserved for EIT

Arbitrate between conflicting event broker requests

Allocating Receiver Privileges

In one embodiment, a directory module includes a corresponding per-application set of privileges that are requested. This directory module must contain a request for this set of privileges along with the producer's certificate and must be signed with the producer's private key. The producer's certificate is signed using the network's private key. The producer's certificate states the maximum privileges that may be granted to any application under that producer. Hence, an application will only be granted a privilege if it is in its per-application set of privileges and it is among the set of maximum privileges that may be granted to any application associated with that producer. In addition to the signature, security is enhanced by requiring the signed directory to contain an accurate hash value corresponding to at least the initial code segment, and optionally to other code and data segments used by the application.

As stated above, all receiver privileges listed above may be granted to the special process known as UI. Additionally, privileges for applications received over the broadcast may be allocated in the same manner as they are allocated for core broadcast applications. Finally, applications received via the return channel may not be granted any receiver privileges. The set of privileges granted to a broadcast application or the UI application are known as its maximum set. Unless the application indicates otherwise using the methods described in the next section, its maximum set of privileges is equal to its current working set of privileges. Applications can set their current working set to a subset of their associated maximum set of privileges using the methods described below.

Least Privileged Mode

Using the methods described in this section, an application can execute in least-privileged mode. This is actually a much more secure mode which ensures that prior to using a privilege, an application specifically states that it is going to use that privilege. One advantage of this mode is that a content author cannot accidentally use a privilege that a network too freely grants. Using this mode, therefore, an application does not obtain more privileges than the network or receiver allows (known as the maximum set), but rather carefully manipulates a working set of privileges that are always a strict subset of that maximum set.

In order to support this mode, two new objects are required in the DOM: (1) the security object and (2) the privilegeManager object. The security object (of class "Security") is accessed through the "security" property of the global object (i.e., the window object). The security object's purpose currently is to contain a property, "privilegeManager", that allows access to the privilegeManager object (class "PrivilegeManager").

The privilegeManager object has four methods: enablePrivilege, disablePrivilege, revertPrivilege, and removePrivilege. These methods allow a script to manipulate privileges.

enablePrivilege Enables a privilege for the duration of the current function.

disablePrivilege Disables a privilege for the duration of the current function.

revertPrivilege Allows a script to revert a privilege to the state that it was in before the current function was called.

removePrivilege Allows a script to remove a privilege from its maximum set. (It is also removed from the working set if enabled.)

Each of these functions returns either true or false depending on whether the operation was successful. Note: when a function returns, any privileges enabled by that function may be automatically reverted to the state they were in at the point when the function was called. When a script attempts to perform a privileged operation without the necessary privilege enabled, an appropriate TBD exception will be thrown. If the exception is not caught, an error dialog box may be displayed before aborting the script.

Additional HTML-specific Privileges

There are a set of privileges which are HTML-specific and mostly may be restricted to a subset of the broadcast html applications. A set of flags may be reserved to be used for additional restricted operations. In one embodiment, HTML applications may use one of these flags to indicate whether an application will be granted all of the following privileges. (That is, if the flag is set, the broadcast HTML application will be granted all of the privileges below and if it is not set, that application will be granted none of the privileges below.)

Script can override the same origin policy, and read properties in another frame that was loaded from a different domain Script can override the same origin policy, and change properties in another frame that was loaded from a different domain.

Script can query user preferences from the HTML Application only uim object.

Script can create, change, and save user preferences from the HTML application only uim object.

Script may submit a form to a mailto: URL

Script may manipulate cookies when and if a more extensive cookie management system is added Script is granted the union of the runtime code extension privileges defined in both ATSC DASE 1 and DVB MHP 1.1.

Whether these privileges are granted to a broadcast application or not may determined using the same mechanism as described in the section entitled "Allocating Receiver Privileges". As above, these privileges may always granted to the special UI application and/or never granted to applications that are not broadcast.

7. Toward a Declarative Approach to Authoring for Showstoppers and Prefetch Priorities Early programming languages were generally very procedural requiring a programmer to tell the computer how to carry out the program in detail. As the examples show, the trend has been towards languages where you specify what to do, but not how. Such languages may be said to be more declarative. Generally speaking, a declarative language is one in which you specify what you want, and not how to get it. Such languages may be particularly useful in providing higher level interfaces to underlying complex systems. For example, HTML may allow you to specify what is to appear on a page, but not how it is to be laid out. Another example is SQL where you specify what you want out of a database query, but do not give code for the looping and testing needed to produce it. It is noted that the discussion herein is not strictly limited to declarative languages per se. Rather, HTML, JavaScript, CSS, and other such languages and constructs are contemplated. In one embodiment, languages and constructs which are commonly used in creating and manipulating Web content are contemplated. In any such case, the declarations or other statements used in the creation and/or manipulation of resources and content in this document may be generally referred to as "directives".

Background

This section (1) describes the showstopper and prefetch requirements; (2) identifies how such information may be carried in both DASE and DVB-MHP; and (3) proposes ways in which authors may indicate both showstopper and prefetch resources within their XHTML documents.

Although details of a transcoding implementation are not described, those skilled in the art may ascertain that the initial values assigned for showstopper and prefetch resources may be automatically translated to existing DASE/DVB-MHP facilities for transport.

Showstopper and Prefetch Requirements

The content creator often wishes to use multiple resources in constructing a scene or presentation and may consider the acquisition of a subset of these resources to be essential before displaying to the viewer. That is, they may prefer that the old scene should continue to be displayed until at least the essential resources have been received and decoded. These essential resources may be referred to as showstoppers because creators do not want anything displayed until at least these essential resources are available. Further, if these resources never become available, the content creator may prefer that nothing be displayed. In addition, marking these resources as essential may enable the broadcast stream to be more easily packaged together to enhance performance.

In general, performance may be enhanced by intelligent pre-fetching of resources. In particular, remarkable performance improvements may be possible when the pre-fetching priorities can be dynamically modified depending upon viewer interaction. Therefore, it is desirable to allow content authors to stipulate both essential resources as well as (dynamically modifiable) prefetch prioritization.

Figure 5:
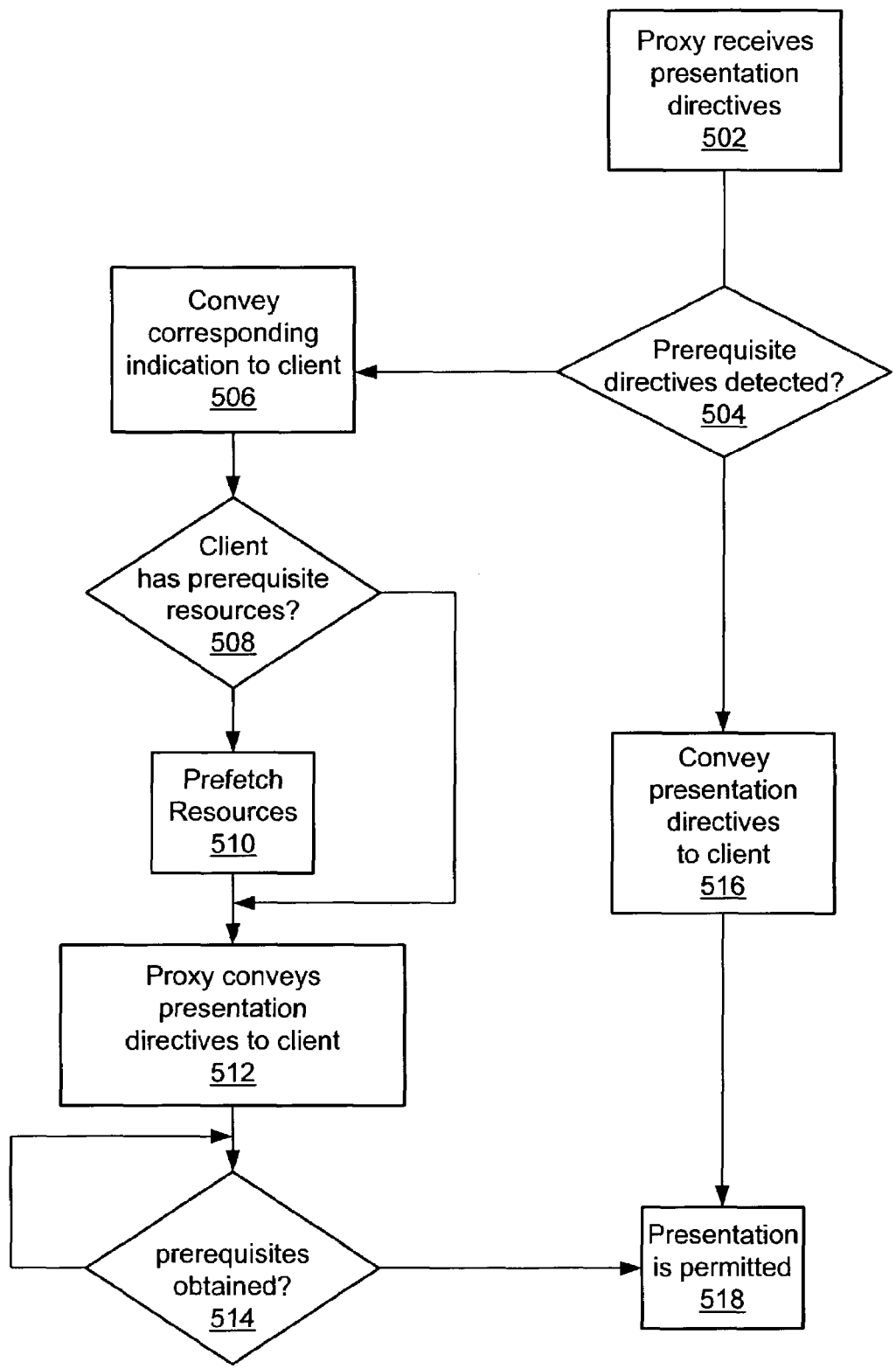
FIG. 5 illustrates one embodiment of a method utilizing prerequisite directives.

FIG. 5 illustrates one embodiment of a method for prefetching prerequisite resources. In the example shown, a centrally located proxy performs preprocessing or transcoding of content which is requested by a client or otherwise destined for a client. When the proxy receives content including presentation directives (block 502), the proxy may scan the content for directives which indicate certain content is deemed a prerequisite for the presentation. If no such directives are detected (decision block 504), then the directives (or signals and/or data corresponding to the presentation directives) are conveyed to the client (block 16) and the presentation may be initiated (block 518).

On the other hand, if such prerequisites directives are detected by the proxy, the proxy may immediately convey an indication to the client (block 506) that these identified resources are considered prerequisites. Upon receiving this indication, the client may then determine whether or not is currently has the identified prerequisite resources (decision block 508). If the client does not have these resources, the client may then take any actions necessary to prefetch the prerequisite resources (block 510). Subsequently, or concurrently, the proxy may convey the remaining presentation content or directives to the client (block 512). Once the client has obtained the prerequisite resources (decision block 514), presentation of the content corresponding to the prerequisite resources is permitted.

It is to be understood that numerous alternatives are possible. For example, in an alternative embodiment, there is not proxy as described. Rather, the client is configured to process resources and content directly. In such an embodiment, the client may be configured to first scan received content for prerequisite directives. Alternatively, the prerequisite directives may be processed as received. Other embodiments are possible and are contemplated.

Support within DASE and DVB MHP

Currently neither DASE's DAE nor MHP's DVB-HTML provides a facility that allows content authors to identify showstoppers or prefetch prioritization. However, they do provide facilities which may be utilized for transporting such information.

Support within DASE

There is explicit support for identifying the initial static priority of resources within an application in DASE's root entity DTD. This support is in the form of the definition of a priority value for a cache item that is associated with a preload attribute. It perhaps in DASE Level 2, to enhance the root entity DTD so that it includes support for showstopper identification; that is, one possible embodiment would be to add an attribute called showstopper.

Prior to such addition, of course, DDE-2 could recommend the use of x-dde2-showstopper as a non-standardized attribute value. Elements identifying the showstoppers and initial pre-fetch priorities could be automatically formulated from the HTML enhancements proposed in the following section and, therefore, would be available to the receiver as soon as the application enters the initialized state. It would not be necessary to modify the prefetch priorities in the root element in response to user interaction, so this very minor enhancement, along with the authoring proposal below, would suffice for fully supporting prefetch and showstopper requirements in the DASE DAE.

Support within DVB-MHP

DVB-MHP provides an optional descriptor, known as the pre-fetch descriptor, within the AIT. As with the DASE root element preload attribute, this descriptor could be automatically generated from the HTML enhancements proposed below. The showstopper resources could be accommodated one of several ways; either by adding a new AIT descriptor for showstopper resources or, alternatively, by setting the priority of showstopper resources to the highest possible value (100).

Proposal for Authoring

Showstoppers

Content authors may desire that there exist a way to identify those resources such that if they are not obtained by a receiver, displaying should be delayed.

Minimal Proposal

It is proposed that DDE may define a profile for DDE specific META name/value pairs. Among those pairs would be the name "prerequisite," with the value being the target URI of the essential resource. An example of this name/value pair would be the one below which indicates that "background.mpg" is an essential resource that needs to be acquired and processed by the receiver prior to displaying the application's initial content.

<META name="prerequisite"content="http://www.cnn.com/background.mpg">

Prefetch Prioritization

As mentioned earlier, content authors may wish to provide a hint concerning both broadcast parameters as well as caching behavior by indicating that it may be desirable to initially prefetch certain resources, independent of whether those resources are considered as essential or prerequisite resources as defined above. It is not necessary that the author-supplied initial prefetch prioritization be identical to the prioritization that is eventually carried in the corresponding signaling file (i.e., the DASE root element or the MHP prefetch descriptor). However, content developers are typically not very good at choosing from among too many different priorities. (Absolute numerical priorities, such as a value between 1 and 100 are often better chosen by more complicated metrics that account for the size of the resource, expected size of cache, rate of transmission of the broadcast stream, etc.)

Therefore, as proposed herein, the content author may be permitted to identify whether or not it is desirable for a receiver to prefetch a particular resource. For example, the content author may identify resources to be prefetched using the 1 ink element in the <head> of the initial document and by defining a new value "prefetch" for the rel attribute of this element. Since there may be several resources that the author would recommend for prefetching, they may indicate a prefetch priority as well. For example, they may order these multiple resources so that the first ones have higher priority than latter ones.

As the DOM allows dynamic modification of the list of link resources at runtime, e.g., based upon user interaction, modified link resources may serve as a hint to the receiver concerning dynamically changing priorities. However, it may also be useful to permit the content author to not only dynamically control prefetch priorities, but also to indicate that the use of a resource is imminent so that the terminal may wish to "precreate" the resource (e.g., allocate resources such as memory, and decode) instead of simply prefetching that resource. In order to permit the content author to accomplish this, a cache object may be used that implements both a prefetch( ) as well as a precreate( ) method.

8. Extended Uniform Resource Identifiers for Television Broadcasts

The use of W3C standards for authoring interactive television content that is to be carried with digital television signals has begun to increase significantly. RFC 2838 (Uniform Resource Identifiers for Television Broadcasts) addressed the need to reference television broadcast streams as a whole; this section extends the description contained therein to include the ability to reference particular substreams and non-video resources that may also be carried in the broadcast stream. In addition to being useful directly within existing client set-top box or television implementations, the scheme described herein may be mapped to proposed transport-specific television schemes, e.g., dvb, ocap, and arib. The purpose of such mapping is to allow a content developer to author their content using the URI described herein, while permitting automatic (or manual) transcoding to one or more of the other proposed schemes.

Extended Television Uniform Resource Identifier (URI)

The basic structure of the extended television URI is:

tvx:<service-address>[<track-list>][<abs-path>]

where

<service-address> is a description of the data source, which may correspond to the DNS-style identifiers defined for "tv:" in RFC 2838. The optional <track-list> can specify audio, video, subtitle, teletext, or data substreams within the stream emanating from the service-address. The <abs-path> can be used to identify individual resources within a substream, or, since its syntax is quite flexible, can be further defined by various of the transport-specific URIs.

Current Channel

The current channel can be specified as tvx://current

This URI refers to whichever television broadcast is currently being accessed by the referring object. This definition differs from the "tv:" definition, as it is specific to the referring object. This difference is necessary because set-top boxes containing multiple tuners, decoders, etc. are becoming more commonplace.

This "current" broadcast may contain multiple audios (e.g., different languages), multiple videos (e.g., different camera angles), and different types of data. However, this URI refers to only those sub-streams that are being used by the destination associated with the referring object. For example, if there are both English and German sub-titles available, but the display associated with the object referencing this URI is only showing the German sub-titles (i.e., is not showing the English sub-titles), then the English sub-titles would not be part of tvx://current.

Syntax (BNF) for Extended Television URIs

The following is an example of a formal specification for the extended television URIs:

| | |
|---|---|
| tvx_uri | = "tvx:" [tvx_hier_part] |
| tvx_hier_part | = tvx_net_path \| tvx_abs_path |
| tvx_net_path | = "//" service_addr [comp_list] [tvx_abs_path] |
| service_addr | = broadcast \| "current" |
| comp_list | = ";" component *("," component ) |
| component | = stream_selector |
| stream_selector | = stream_type "=" stream_id |
| stream_type | = "video" \| "audio" \| "data" \| "subtitle" \| "teletext" |
| stream_id | = 1*alphanum \| "default" \| "current" \| "none" |
| tvx_abs_path | = "/" path_segments |
| where: | |
| broadcast | may be as defined in RFC2838) |
| path_segments | may be as defined in RFC 2396 |
| alphanum | may be as defined in RFC 2396 |

Semantics for Extended Television URIs

This section defines the meaning of the various forms of the extended television URIs.

Service Address Alone

The substream referenced by a service address alone may consist of video, audio, teletext, subtitle, and data streams. Data streams may contain executable code in addition to data used by that code or data used by a resident application. In addition, there may be more than one stream of each type in the referenced substream. For example, tvx://bcd.com may contain 2 video streams, 4 audio streams, one teletext stream, one subtitle stream, and five data streams. Which streams are "displayed" by the object referencing this URI can depend upon many factors. If the viewer has selected a default setting which indicates a preference concerning whether or not teletext and/or subtitles are displayed, then that preference may be used to determine whether these streams are displayed. Additionally a viewer may indicate a preferred audio language.

The broadcasting network may use signaling to indicate the default video stream, and, for example, in the case of DVB MHP, may indicate that particular applications should be downloaded and executed. If the receiver has the ability to decode at least one video stream and one audio stream concurrently, then in one embodiment at least one of each will be decoded when a tvx URI of this form is specified. Further, the viewer may be provided with controls which enable them to "mute" the audio or video. If the viewer has not muted a stream, but also has not selected a preference, and the network has not indicated a preference, then any one of the corresponding streams may be decoded and displayed.

As stated above, while a URI of the form "tvx://current" may also be used, referencing this URI does not generally change which streams are being decoded (and presented).

Specifying Components

The content author can reference particular substreams within the stream using this URI. For example, "tvx://bcd.com;audio=eng" may refer to an English audio substream. Also, more than one stream may be referenced using this form of the URI. For example, "tvx://bcd.com;video=catcher;audio=eng" may be used to refer to a video which is shot from behind a baseball catcher along with the English audio. It is expected that the content author may have appropriate tools by which they can either set a "track tag" (e.g., catcher, eng) to correspond to a particular substream, or that a set of track tags may be determined by a standard or by a video producer, for example.

In one embdodiment, there are two special keywords that may be used as track tags which are defined in this document: "current" and "default." The "current" track tag indicates the substream that is currently being displayed. For example, if the viewer is currently watching a movie and is listening to the French audio, their audio may be changed to English without affecting the video through the use of the following URI: "tvx://current;video=current;audio=eng" (providing that the track tag "eng" had been associated with the audio).

The "default" keyword may be used to refer to the default as defined by the viewer, author, receiver, content author or some combination, as per a particular specification and/or instantiation. That is, in some vertical networks, the network operator may have the authority to set a default preference and in other networks, it may be up to the viewer.

Path Segments

Path segments may be used to identify a resource within a particular component. For example, "tvx://bcd.com;data=novice/game/chess/move3" may refer to the resource game/chess/move3 which is carried in the data substream with the track tag of novice.

Additional meanings may be assigned to the path segments when the various transport-specific television URIs are mapped to this URI. However, until they are so defined, path segments shall only be meaningful when the component type is data.

Various embodiments may further include receiving, sending or storing instructions and/or data implemented in accordance with the foregoing description upon a carrier medium. Generally speaking, a carrier medium may include transmission media or signals used in broadcast systems and otherwise such as electrical, electromagnetic, or digital signals, conveyed via a communication medium such as network and/or a wireless link. For example, a network operator may convey signals which describe program instructions via a broadcast system. A carrier medium may also include storage media or memory media such as magnetic or optical media, e.g., disk or CD-ROM, volatile or non-volatile media such as RAM (e.g. SDRAM, RDRAM, SRAM, etc.), ROM, etc.

It is to be understood that the above embodiments are intended to be exemplary only. Numerous alternative configurations are possible and are contemplated.

What is claimed is:

1. A method comprising:
   receiving one or more directives, wherein said directives are indicative of an audio, video and/or graphic presentation which requires a set of resources;
   determining whether said one or more directives includes a prerequisite directive which indicates that acciuisition of a subset of said set of resources is a prerequisite for initiating the presentation;
   initiating said presentation, in response to determining the one or more directives do not include said prerequisite directive; and
   prohibiting initiation of said presentation until said subset of resources are acquired, in response to determining the one or more directives include said prerequisite directive.

2. The method of claim 1, wherein said prerequisite directive comprises one or more directives selected from the group consisting of: a markup language, a scripting language, and a style sheet.

3. The method of claim 2, wherein said one or more directives are received by a proxy server in an interactive television system.

4. The method of claim 3, wherein said determining is performed by said proxy server, and wherein said method further comprises said proxy server conveying signals indicative of said subset of resources to a remote client device.

5. The method of claim 4, further comprising said client device acquiring said subset of resources in response to detecting said signals.

6. The method of claim 5, wherein said subset comprises streaming audio and/or video, and wherein acquisition of the streaming audio and/or video comprises configuring hardware resources within said client device.

7. The method of claim 5, wherein acquisition of the subset of resources comprises the client device initiating requests for remotely located resources to be conveyed to said client device.

8. The method of claim 1, further comprising enhancing a root entity in DTD to add a showstopper attribute indicative of prerequisite resources.

9. The method of claim 1, further comprising using a label within a Declarative Data Essence standard as an attribute to indicate a prerequisite resource.

10. The method of claim 1, further comprising enhancing DVB-MHP by adding a showstopper AIT descriptor indicative of prerequisite resources.

11. The method of claim 1, further comprising defining a META name/value pair, wherein said name is indicative that said corresponding value is a prerequisite resource.

12. The method of claim 1, wherein said prohibiting is in further response to detecting a corresponding time for expiration has not yet expired, and wherein said method further comprises allowing the presenting of said presentation in response to detecting said time for expiration has expired.

13. An interactive television system comprising:
   a remote proxy server configured to:
      receive one or more directives, wherein said directives are indicative of an audio, video and/or graphic presentation which requires a set of resources;

determine whether said one or more directives includes a prerequisite directive which indicates that acquisition of a subset of said set of resources is a prerequisite for initiating the presentation;

convey first signals which identify said subset of resources to a remote client device, in response to determining the one or more directives include said prerequisite directive; and convey second signals which correspond to said one or more directives;

a client device configured to:

receive said first signals;

receive said second signals; and prohibit initiation of said presentation until said subset of resources are acquired, in response to detecting said first signals.

14. The system of claim 13, wherein said prerequisite directive comprises one or more directives selected from the group consisting of: a markup language, a scripting language, and a style sheet.

15. The system of claim 14, wherein acquiring said subset of resources comprises said client device configuring hardware resources within said client device.

16. The system of claim 14, wherein acquiring said subset of resources comprises initiating requests for remotely located resources to be conveyed to said client device.

17. The system of claim 13, further comprising enhancing a root entity in DTD by adding a showstopper attribute indicative of prerequisite resources.

18. The system of claim 13, wherein said directives include the use of a showstopper attribute indicative of prerequisite resources.

19. The system of claim 13, wherein said server is configured to detect a DVB-MHP showstopper AIT descriptor indicative of prerequisite resources.

20. The system of claim 13, wherein said directives define a META name/value pair, wherein said name is indicative that said corresponding value is a prerequisite resource.

21. The system of claim 13, wherein said device is configured to prohibit said initiation in further response to detecting a corresponding time for expiration has not yet expired, and wherein said device is further configured to allow the presenting of said presentation in response to detecting said time for expiration has expired.

22. A client device in an interactive television system, said device comprising:

a receiver configured to receive signals corresponding to directives which are indicative of an audio, video and/or graphic presentation requiring a set of resources; and a processing unit coupled to said receiver, wherein said processing unit is configured to:

determine whether said one or more directives includes a prerequisite directive which indicates that acquisition of a subset of said set of resources is a prerequisite for initiating the presentation;

initiate said presentation, in response to determining the one or more directives do not include said prerequisite directive; and prohibit initiation of said presentation until said subset of resources are acquired, in response to determining the one or more directives include said prerequisite directive.

23. A computer readable medium comprising program instructions executable by a computer to:

receive directives which are indicative of an audio, video and/or graphic presentation which requires a set of resources;

determine whether said one or more directives includes a prerequisite directive which indicates that acquisition of a subset of said set of resources is a prerequisite for the presentation;

initiate said presentation, in response to determining the one or more directives do not include said prerequisite directive; and prohibit the presenting of said presentation until said subset of resources are acquired, in response to determining the one or more directives include said prerequisite directive.

* * * * *